(12) United States Patent
Egami

(10) Patent No.: US 6,917,872 B2
(45) Date of Patent: Jul. 12, 2005

(54) DRIVING ASSIST SYSTEM FOR VEHICLE

(75) Inventor: Masahiro Egami, Yokosuka (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 10/462,749

(22) Filed: Jun. 17, 2003

(65) Prior Publication Data

US 2003/0233187 A1 Dec. 18, 2003

(30) Foreign Application Priority Data

Jun. 18, 2002 (JP) ........................................ 2002-177028

(51) Int. Cl.[7] .............................................. G06F 7/00
(52) U.S. Cl. ........................................ 701/96; 180/170
(58) Field of Search .................. 701/96, 70; 340/425.5, 340/435, 436, 903; 180/170

(56) References Cited

U.S. PATENT DOCUMENTS

| | | | | |
|---|---|---|---|---|
| 5,865,265 A | * | 2/1999 | Matsumoto | .................. 180/169 |
| 6,057,754 A | * | 5/2000 | Kinoshita et al. | ............ 340/435 |

FOREIGN PATENT DOCUMENTS

| | | |
|---|---|---|
| DE | 195 06 629 | 8/1996 |
| DE | 196 20 929 | 11/1997 |
| DE | 199 16 434 | 10/2000 |
| JP | 56-108953 U | 8/1981 |
| JP | 57-33048 | 2/1982 |
| JP | 57-167845 | 10/1982 |
| JP | 62-51035 U | 3/1987 |
| JP | 63-258225 | 10/1988 |
| JP | 2-291099 | 11/1990 |
| JP | 03-217627 | 9/1991 |
| JP | 05-231194 | 9/1993 |
| JP | 05-345536 | 12/1993 |
| JP | 7-4211 | 1/1995 |
| JP | H7-4211 U | 1/1995 |
| JP | 08-017000 | 1/1996 |
| JP | 8-166448 | 6/1996 |
| JP | 08-263160 | 10/1996 |
| JP | 09-254677 | 9/1997 |
| JP | 10-166889 | 6/1998 |
| JP | 10-166890 | 6/1998 |
| JP | 10-318009 | 12/1998 |
| JP | 10-338110 | 12/1998 |
| JP | 2000-54860 | 2/2000 |
| JP | 2000-158970 | 6/2000 |
| JP | 2000-296724 | 10/2000 |
| JP | 2001-048034 | 2/2001 |
| JP | 2001-171497 | 6/2001 |

OTHER PUBLICATIONS

Copending patent application entitled "Accelerator Pedal Device", Shunsuke Hijikata, filed Jun. 13, 2003, our reference No. 61355–039.

Copending patent application entitled "Accelerator Pedal Device", Masahiro Egami, filed Jun. 13, 2003, our reference No. 61355–040.

Copending patent application entitled "Driving Assist System for Vehicle", Nobuyuki Kuge et al., filed Jun. 13, 2003, our reference No. 61355–041.

\* cited by examiner

*Primary Examiner*—Yonel Beaulieu
(74) *Attorney, Agent, or Firm*—McDermott Will & Emery LLP

(57) ABSTRACT

A vehicle driving assist system comprises a traveling situation detection device that detects a vehicle condition and a traveling environment around a subject vehicle; a risk potential calculation device that calculates a risk potential around the subject vehicle based upon detection results of the traveling situation detection device; an accelerator pedal reaction force control device that controls an actuation reaction force which is generated for an accelerator pedal based upon the risk potential which has been calculated by the risk potential calculation device; an actuation amount detection device that detects an actuation amount of the accelerator pedal; and a vehicle distance control device that controls a distance between the subject vehicle and a preceding vehicle present in front of the subject vehicle based upon the accelerator pedal actuation amount which is detected by the actuation amount detection device.

15 Claims, 14 Drawing Sheets

DRIVING ASSIST SYSTEM FOR VEHICLE

BACKGROUND OF THE INVENTION

1. Field of the Invention

The present invention relates to a driving assist system for a vehicle that assists an operator to drive a vehicle, to a method therefor, and to a vehicle that is equipped with this system.

2. Description of Related Art

As a system for assisting an operator to drive a vehicle, there is known, the one disclosed in Japanese Patent Laid Open Publication No. 2000-54860. This system is one which, for automatic cruise control, varies the actuation reaction force of the accelerator pedal based upon the vehicle distance between the vehicle in front and the subject vehicle as detected by a laser radar system or the like. For example, with this system, during automatic cruise control, the accelerator pedal reaction force is set to be hard so as to allow the operator to rest his foot upon the accelerator pedal.

SUMMARY OF THE INVENTION

However, with the above described system, there is a possibility that it may become difficult to maintain a suitable vehicle distance, due to control delays in the system upon deceleration of the vehicle in front and a cut-in vehicle (a vehicle that has just cut in in front of the subject vehicle) from an adjacent vehicle lane or the like. Due to this, even when the vehicle distance control is being performed to maintain the distance to the preceding vehicle, it is necessary for the operator always to observe the environment surrounding the vehicle and to perform brake actuation or the like as appropriate. Accordingly, although it is possible to alleviate the physical load upon the operator by performing the vehicle distance control, it has been difficult to alleviate the mental stress upon the operator.

The present invention is to provide a driving assist system for a vehicle, a method therefor and a vehicle equipped with this system which, along with performing the vehicle distance control, assists the driving operation by an operator by varying the accelerator pedal reaction force according to change of the vehicle traveling situation.

A vehicle driving assist system according to the present invention comprises a traveling situation detection device that detects a vehicle condition and a traveling environment around a subject vehicle; a risk potential calculation device that calculates a risk potential around the subject vehicle based upon detection results of the traveling situation detection device; an accelerator pedal reaction force control device that controls an actuation reaction force which is generated for an accelerator pedal based upon the risk potential which has been calculated by the risk potential calculation device; an actuation amount detection device that detects an actuation amount of the accelerator pedal; and a vehicle distance control device that controls a distance between the subject vehicle and a preceding vehicle present in front of the subject vehicle based upon the accelerator pedal actuation amount which is detected by the actuation amount detection device.

A vehicle driving assist system according to the present invention comprises a traveling situation detection means for detecting a vehicle condition and a traveling environment around a subject vehicle; a risk potential calculation means for calculating a risk potential around the subject vehicle based upon detection results of the traveling situation detection means; an accelerator pedal reaction force control means for controlling an actuation reaction force which is generated for an accelerator pedal based upon the risk potential which has been calculated by the risk potential calculation means; an actuation amount detection means for detecting an actuation amount of the accelerator pedal; and a vehicle distance control means for controlling a distance between the subject vehicle and a preceding vehicle present in front of the subject vehicle based upon the accelerator pedal actuation amount which is detected by the actuation amount detection means.

A vehicle driving assist method according to the present invention detects a vehicle condition and a traveling environment around a subject vehicle; calculates a risk potential around the subject vehicle based upon the vehicle condition and the traveling environment around the subject vehicle; controls an actuation reaction force for an accelerator pedal based upon the risk potential which has been calculated; and changes over control mode upon the subject vehicle based upon an actuation amount of the accelerator pedal between a vehicle distance control and a drive force control, with the vehicle distance control controlling a distance between the subject vehicle and a preceding vehicle present in front of the subject vehicle based upon the accelerator pedal actuation amount, and the drive force control controlling a drive force for the subject vehicle based upon the accelerator pedal actuation amount.

A vehicle according to the present invention comprises a traveling situation detection device that detects a vehicle condition and a traveling environment around a subject vehicle; a risk potential calculation device that calculates a risk potential around the subject vehicle based upon detection results of the traveling situation detection device; an accelerator pedal reaction force control device that controls an actuation reaction force which is generated for an accelerator pedal based upon the risk potential which has been calculated by the risk potential calculation device; an actuation amount detection device that detects an actuation amount of the accelerator pedal; and a vehicle distance control device that controls a distance between the subject vehicle and a preceding vehicle present in front of the subject vehicle based upon the accelerator pedal actuation amount which is detected by the actuation amount detection device.

DESCRIPTION OF THE PREFERRED EMBODIMENTS

-First Embodiment-

Figure 1:
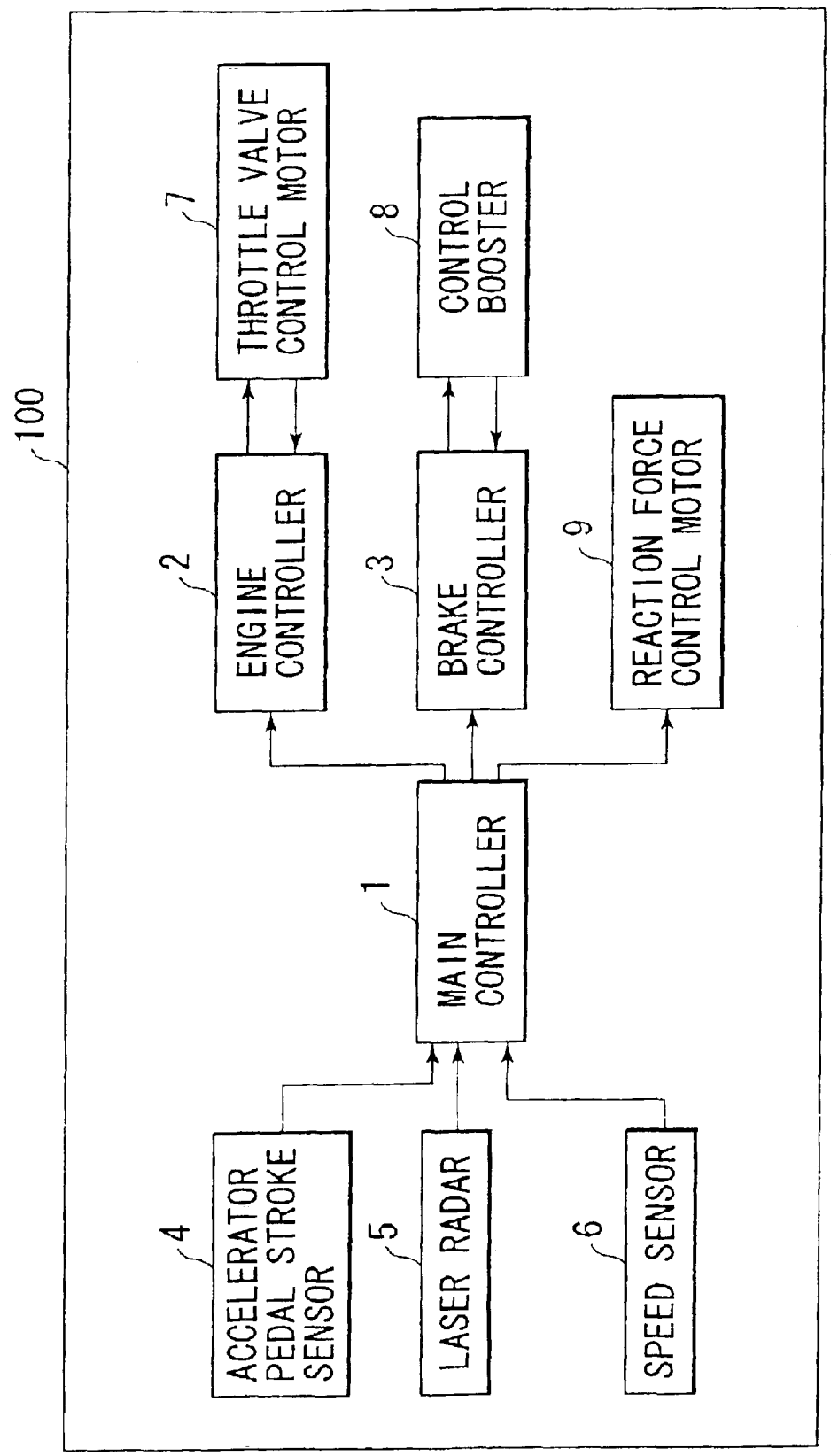
FIG. 1 is a figure showing the structure of the driving assist system for a vehicle according to the present invention.
Figure 2:
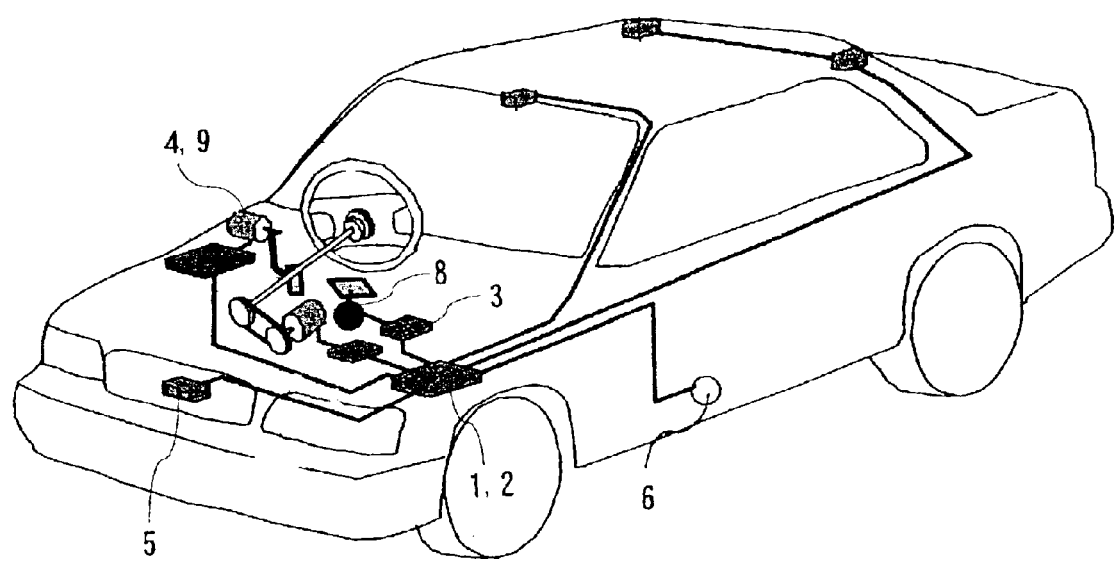
FIG. 2 is a structural diagram of a vehicle to which this driving assist system is fitted.

The first preferred embodiment of the driving assist system for a vehicle according to the present invention will now be explained with reference to the figures. FIG. 1 is a block diagram showing the structure of a driving assist system 100 for a vehicle according to this first preferred embodiment of the present invention, and FIG. 2 is a structural diagram of a vehicle to which this driving assist system 100 is fitted. Moreover, FIG. 3 is a figure showing the structure in the neighborhood of an accelerator pedal, while FIG. 4 is a figure showing the structure in the neighborhood of a throttle valve.

First, the structure of this vehicle driving assist system 100 will be explained.

Figure 3:
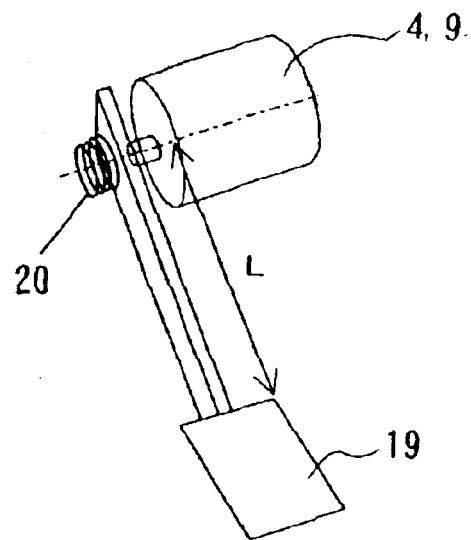
FIG. 3 is a figure showing the structure in the neighborhood of an accelerator pedal.
Figure 4:
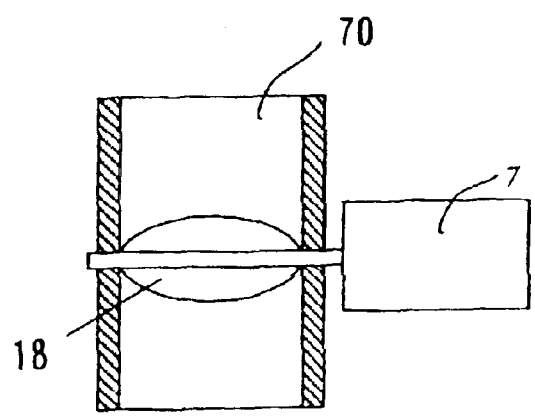
FIG. 4 is a figure showing the structure in the neighborhood of a throttle valve.

As shown in FIG. 3, an accelerator pedal stroke sensor 4 is assembled to a reaction force control motor 9 which is disposed at the center of rotation of an accelerator pedal 19. The accelerator pedal stroke sensor 4 detects the amount of actuation of the accelerator pedal which has been converted into the rotational angle of the reaction force control motor 9, and outputs the result of this detection to a main controller 1. A torsion spring 20 is fixed at the center of rotation of the accelerator pedal 19, and the actuation reaction force of the accelerator pedal 19 is controlled by the spring force of the spring 20 and by the torque which is generated by the reaction force control motor 9. It should be understood that the driving of the reaction force control motor 9 is controlled by a command signal which is inputted from the main controller 1.

A laser radar 5 may be mounted to a front grille of the vehicle. Such a laser radar 5 is of a type which can scan horizontally and laterally about 6 degrees to each side of an axis parallel to the vehicle longitudinal center line, and which propagates infrared pulses in the forwards direction and receives any radiation which is reflected by an obstacle, such as a rear bumper of a preceding vehicle. Such a laser radar 5 provides information regarding the separation or distance and the relative velocity between the subject vehicle and the preceding vehicle.

A speed sensor 6 detects the traveling speed of the subject vehicle based upon the rotational speed of the wheels or the like, and outputs this subject vehicle speed or velocity which has been detected to the main controller 1.

The main controller 1 performs control for the entire vehicle driving assist system. With the main controller 1 of this first preferred embodiment, it performs accelerator pedal reaction force control for generating an accelerator pedal reaction force according to a risk potential PF in the surroundings of the subject vehicle due to the traveling situation, drive force control for generating an engine drive force according to the accelerator pedal actuation amount, and vehicle distance control for exerting control so as to make the distance between the subject vehicle and the preceding vehicle correspond to the accelerator pedal actuation amount. The details of the control which is performed by the main controller 1 will be described hereinafter.

The main controller 1 calculates a target drive force to be generated for the subject vehicle based upon the signals which have been inputted from the accelerator pedal stroke sensor 4, the laser radar 5, and the speed sensor 6, and outputs the target drive force which has been calculated to the engine controller 2 and the brake controller 3. Furthermore, the main controller 1 calculates a target reaction force which is to be generated for the accelerator pedal 19 based upon the signals which have been inputted from the accelerator pedal stroke sensor 4, the laser radar 5, and the speed sensor 6, and outputs the target reaction force which has been calculated to the reaction force control motor 9.

Figure 5:
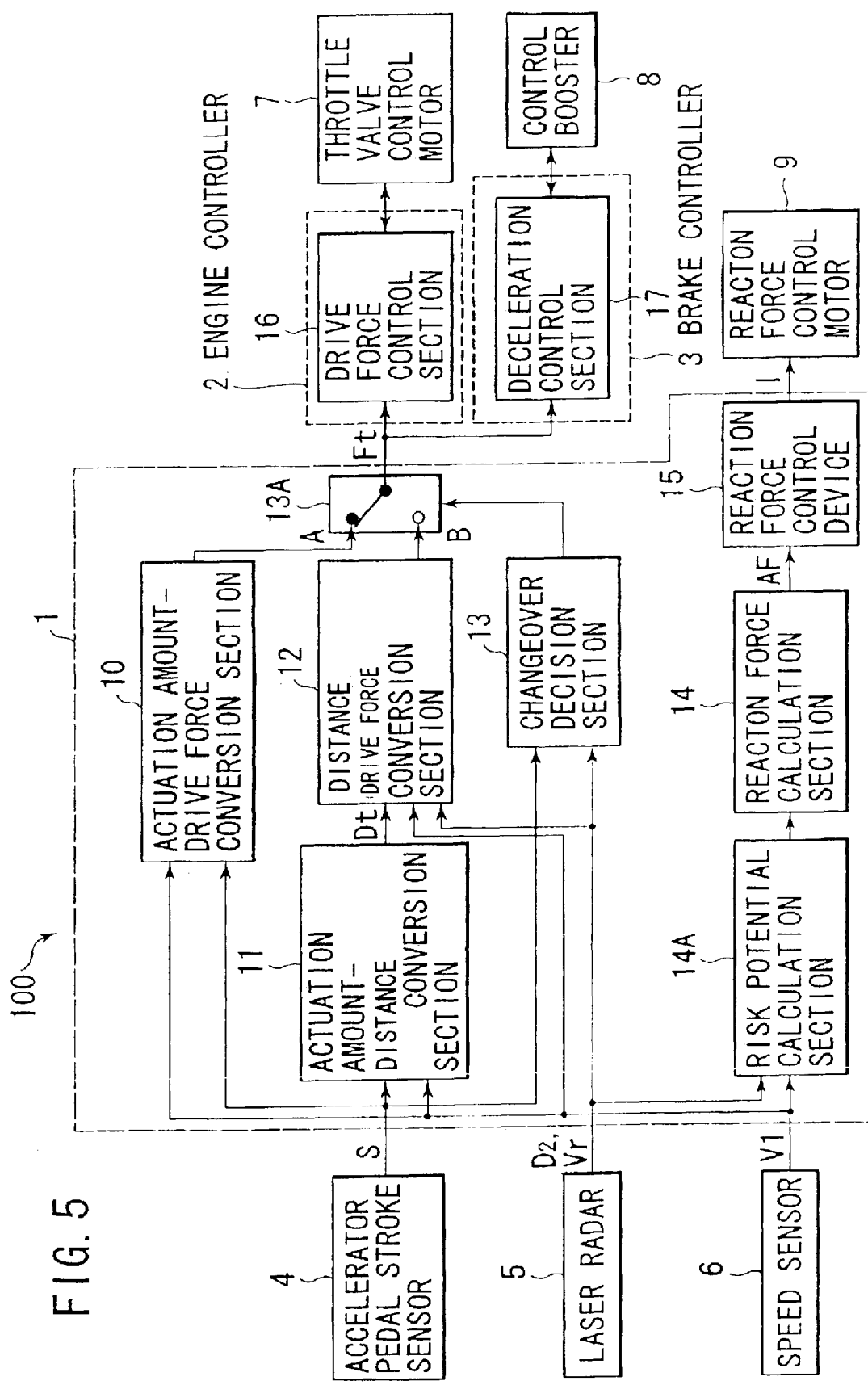
FIG. 5 is a figure showing the structure in the interior of a main controller and in its neighborhood.

An engine controller 2 comprises a drive force control section 16 as shown in FIG. 5. The drive force control section 16 outputs a command to a throttle valve control motor 7 to generate the target drive force which is inputted from the main controller 1. As shown in FIG. 4, a throttle valve 18 which regulates air flow into the engine is provided in an intake conduit 70 of the engine, and the throttle valve control motor 7 is provided at the center of rotation of this throttle valve 18. The throttle valve control motor 7 controls the throttle position of the throttle valve 18 so that the engine produces the target drive force, according to the command signal from the drive force control section 16.

A brake controller comprises a deceleration control section 17 as shown in FIG. 5. The deceleration control section 17 controls the control booster 8 so as to implement the target drive force which is inputted from the main controller 1. The control booster 8 comprises a brake booster with a solenoid valve, for example, which controls the brake fluid pressure electrically. This control booster 8 adjusts the deceleration of the vehicle by driving the solenoid valve according to a command signal from the deceleration control section 17.

The reaction force control motor 9 controls its own torque according to a command signal from the main controller 1. By controlling the torque produced by the reaction force control motor 9, the actuation reaction force can be controlled when the operator actuates the accelerator pedal 19.

FIG. 5 is a block diagram showing the structure of the interior of the main controller 1 for this vehicle driving assist system 100, and also the structure of its surrounding elements. The main controller 1 comprises a CPU and components peripheral to the CPU such as a ROM, a RAM, and the like. The main controller 1 constitutes an actuation amount—drive force conversion section (AF conversion section) 10, an actuation amount—distance conversion section (AD conversion section) 11, a distance—drive force conversion section (DF conversion section) 12, a changeover decision section 13, a risk potential calculation section 14A, a reaction force calculation section 14, and a reaction force control device 15 in the form of software in CPU.

The risk potential calculation section 14A calculates the risk potential PF around the subject vehicle according to the traveling situation in the surroundings of the subject vehicle, using the subject vehicle speed which is inputted from the speed sensor 6, and the vehicle distance and the relative speed or velocity to the preceding vehicle which are inputted from the laser radar 5. The reaction force calculation section 14 calculates a target reaction force to be generated for the accelerator pedal 19 based upon the risk potential PF which has been calculated by the risk potential calculation section 14A, and outputs this target reaction force to the reaction force control device 15. This reaction force control device 15 outputs a command to the reaction force control motor 9 to generate the target reaction force.

The AF conversion section 10 performs drive force control processing according to the amount of actuation of the accelerator pedal 19. The AD conversion section 11 and the DF conversion section 12 perform vehicle distance control processing according to the accelerator pedal actuation amount. The changeover decision section 13 makes a decision upon changeover between the drive force control and the vehicle distance control based upon the signals which are inputted from the accelerator pedal stroke sensor 4 and the laser radar 5, and then changes over a changeover switch 13A. The target drive force which has been calculated by the AF conversion section 10 or the DF conversion section 12 is outputted via the changeover switch 13A to the engine controller 2 and to the brake controller 3.

Next, the operation of this vehicle driving assist system 100 according to the first preferred embodiment of the present invention will be explained.

First, the accelerator pedal reaction force control executed by the main controller 1 will be explained. The risk potential calculation section 14A determines the risk potential PF for the subject vehicle according to the current traveling situation, based upon the subject vehicle speed V1, the vehicle distance D2 and the relative speed Vr between the subject vehicle and the preceding vehicle. The relative speed Vr is given by calculation of V2−V1, wherein V2 represents the preceding vehicle speed. This risk potential PF is set in advance as a predetermined map with respect to the subject vehicle speed V1, the vehicle distance D2 and the relative speed Vr. In particular, the risk potential map is set so that the risk potential PF is higher, the greater is the subject vehicle speed V1, the smaller is the vehicle distance D2, and the smaller is the relative speed Vr.

Figure 6:
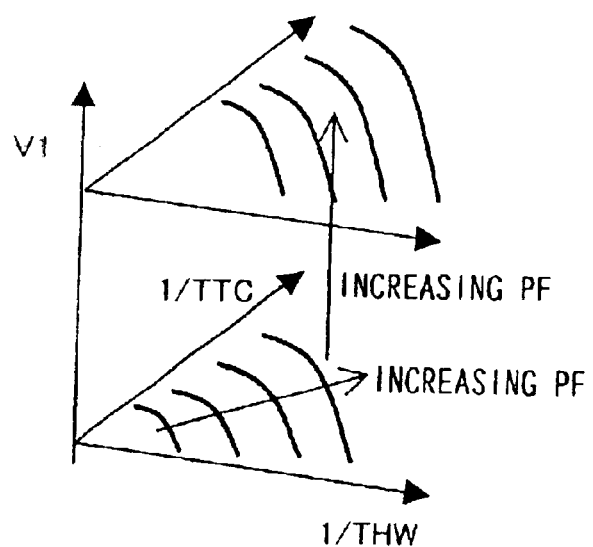
FIG. 6 is a figure showing an example of a risk potential map.

FIG. 6 shows an example of a map of the risk potential PF. This risk potential PF, for example, may be expressed using the subject vehicle speed V1 and the degree of propinquity or closeness of the subject vehicle towards the preceding vehicle. The degree of propinquity or proximity of the subject vehicle to the preceding vehicle may be expressed as a function of a time to contact TTC and a time headway THW. Here, the time to contact TTC and the time headway THW can be calculated using the following [Equation 1] and [Equation 2].

$$TTC = D2/Vr \quad \text{[Equation 1]}$$

$$THW = D2/V1 \quad \text{[Equation 2]}$$

The time to contact TTC is a value which indicates after how many seconds the subject vehicle and the preceding vehicle will come into mutual contact, if the current traveling situation persists, in other words if the current relative speed Vr remains constant. The time headway THW is a value which indicates the time period until the subject vehicle will arrive at the current position of the vehicle in front, at the current subject vehicle speed of V1. The reciprocal 1/TTC of the time to contact TTC and the reciprocal 1/THW of the time headway THW are each taken as the degree of propinquity of the subject vehicle to the preceding vehicle.

As shown in FIG. 6, the risk potential map is established so that the risk potential PF becomes the greater, the greater does the reciprocal 1/THW of the time headway THW become, and the greater does the reciprocal 1/TTC of the time to contact TTC become, in other words the greater does the degree of propinquity of the subject vehicle with respect to the preceding vehicle become. Furthermore, as shown in FIG. 6, this risk potential map is established so that the risk potential PF becomes the greater, the greater is the subject vehicle speed V1.

Figure 7:
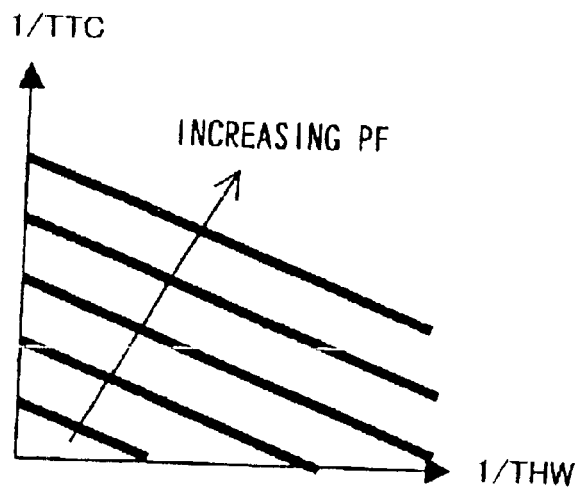
FIG. 7 is a figure showing another example of a risk potential map.

It should be understood that it would also be possible to establish this risk potential map based only upon the degree of propinquity of the subject vehicle to the preceding vehicle. In FIG. 7, there is shown a risk potential map according to the degree of propinquity of the subject vehicle to the preceding vehicle. As shown in FIG. 7, this risk potential map is established so that the risk potential PF becomes the greater, the greater does the reciprocal 1/TTC of the time to contact TTC become, and the greater does the reciprocal 1/THW of the time headway THW become, in other words the greater does the degree of propinquity of the subject vehicle with respect to the preceding vehicle.

If no preceding vehicle is present in the lane in which the subject vehicle is traveling, then, for example, the risk potential PF may be set to zero, assuming that the time to contact TTC and the time headway THW are infinite. It should be understood that the lines shown in FIG. 6 and FIG. 7 are lines of equal risk potential along which the risk potential PF is substantially constant, and the risk potential PF increases in the direction indicated by the arrow signs.

Figure 8:
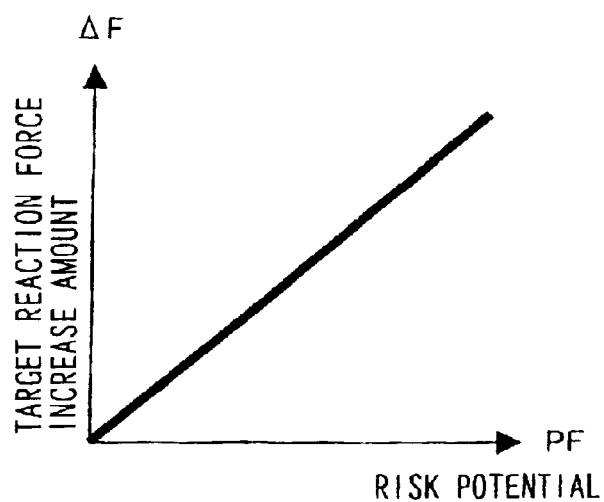
FIG. 8 is a figure showing the characteristic of a target reaction force increase amount $\Delta F$ with respect to risk potential.

The reaction force calculation section 14 calculates a target reaction force to be generated for the accelerator pedal 19, based upon the risk potential PF around the subject vehicle which has been calculated by the risk potential calculation section 14A. In FIG. 8 there is shown an example of the characteristic of the target reaction force increase amount ΔAF with respect to the risk potential PF. As shown in FIG. 8, the greater is the risk potential PF, the greater is the target reaction force increase amount ΔAF set to become.

The reaction force calculation section 14 calculates a target reaction force AF to be generated for the accelerator pedal 19 by adding the reaction force increase amount ΔAF which corresponds to the risk potential PF to the normal reaction force characteristic of the accelerator pedal 19. The normal reaction force characteristic is set so that, for example, the reaction force AF which is generated for the accelerator pedal 19 becomes the greater, the greater is the accelerator pedal actuation amount S; and it may be implemented by the spring force of the spring 20. The reaction force calculation section 14 outputs the target reaction force AF thus calculated to the reaction force control device 15.

The reaction force control device 15 controls an electrical current I which is outputted to the reaction force control motor 9 so as to implement the target reaction force AF. This electrical current I is given by the following [Equation 3].

$$I = AF \times L/K \quad \text{[Equation 3]}$$

Here, L represents the length of the lever arm of the accelerator pedal 19 (refer to FIG. 2), and K represents the torque constant of the reaction force control motor 9. The reaction force control device 15 outputs the electrical current I which has been calculated to the reaction force control motor 9, and thereby controls the pedal reaction force AF which is generated for the accelerator pedal 19.

Next, the drive force control which is performed by the main controller 1 will be explained. If no preceding vehicle is detected by the laser radar 5 in front of the subject vehicle, the main controller 1 performs drive force control so as to generate a drive force which corresponds to the accelerator pedal actuation amount S. When performing drive force control, the changeover decision section 13 of the main controller 1 changes over the changeover switch 13A to its A side according to the signal which is inputted from the laser radar 5. It is to be understood that the state in which there is no preceding vehicle detected includes the state in which the vehicle distance D2 is greater than a predetermined value so that the vehicle in front is relatively distant, in other words in which no vehicle after which the subject vehicle should follow is present in the vehicle lane in which the subject vehicle is traveling.

The target drive force Fta to be generated by the engine of the vehicle is defined based upon the accelerator pedal actuation amount S, the subject vehicle speed V1, and the gear of the transmission which is currently selected. For example if, as when starting the vehicle off from rest, the lowest gear is currently selected, the target drive force Fta is set to be the greater, the greater is the accelerator pedal actuation amount S, and the lower is the subject vehicle speed V1.

The AF conversion section 10 calculates the target drive force Fta based upon the accelerator pedal actuation amount S which is detected by the accelerator pedal stroke sensor 4 and the subject vehicle speed V1 which is detected by the speed sensor 6, and outputs the target drive force Fta which it has calculated to the engine controller 2. This target drive force Fta calculated by the AF conversion section 10 is taken as a first target drive force Fta for performing the drive force control.

The drive force control section 16 of the engine controller 2 outputs a command to the throttle valve control motor 7 so as to implement the first target drive force Fta which has been inputted from the main controller 1. The throttle valve control motor 7 controls the throttle position of the throttle valve 18 according to this command, and thereby adjusts the torque of the vehicle engine.

It should be understood that it would also be possible not to perform the calculation of the first target drive force Fta by the AF conversion section 10, but to take a value which corresponds to the accelerator pedal actuation amount S which is detected by the accelerator pedal stroke sensor 4 as a target position for the throttle valve 18. In this case, the main controller 1 outputs this target throttle position which corresponds to the accelerator pedal actuation amount S to the throttle valve control motor 7, and thereby performs the drive force control.

As has been described above, if no preceding vehicle for the subject vehicle to follow is present in front of the subject vehicle in its own vehicle lane, the accelerator pedal reaction force AF is increased according to a normal reaction force characteristic so that the accelerator pedal actuation amount S becomes the greater, the greater is the subject vehicle speed V1. Since an engine drive force is generated in correspondence to the accelerator pedal actuation amount S, it is possible for an operator to recognize the traveling situation around the subject vehicle by sensing changes of the accelerator pedal reaction force AF and therefore to perform driving at his will.

In the following, the details of the vehicle distance control performed by the main controller 1 will be explained. In this first preferred embodiment of the present invention, the vehicle distance control is performed if a vehicle to be followed is present in front of the subject vehicle in its own vehicle lane, and if moreover the amount by which the accelerator pedal 19 is being actuated is within a predetermined range, for example $Smin \leq S \leq Smax$. In concrete terms, the main controller 1 controls the driving of the subject vehicle so as to maintain a vehicle distance to the preceding vehicle according to the accelerator pedal actuation amount S, thus following along behind the preceding vehicle. The changeover decision section 13 of the main controller 1 changes over the changeover switch 13A to its B side when performing the vehicle distance control in response to the signals which are being inputted from the accelerator pedal stroke sensor 4 and the laser radar 5.

Figure 9:
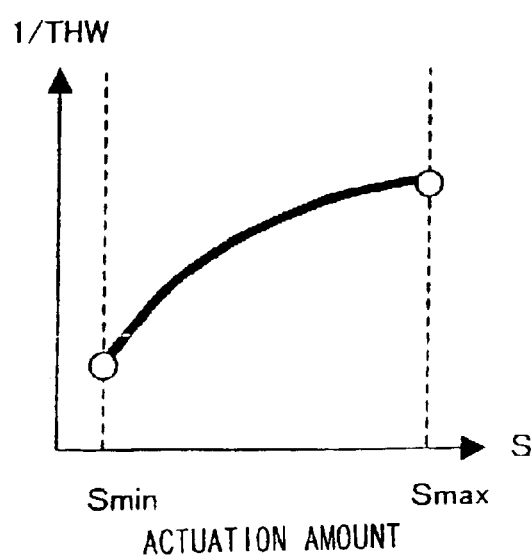
FIG. 9 is a figure for setting the target vehicle distance in accordance with the accelerator pedal actuation amount, according to the first embodiment of the present invention.

The AD conversion section 11 calculates a target distance Dt based upon the accelerator pedal actuation amount S which is being detected by the accelerator pedal stroke sensor 4. This target distance Dt can be determined using a map set in advance based upon the accelerator pedal actuation amount S. In FIG. 9 there is shown an example of a map for calculating the target distance Dt from the accelerator pedal actuation amount S. It should be understood that, in FIG. 9, the accelerator pedal actuation amount S is shown along the horizontal axis, while the reciprocal 1/THW of the target time headway THW is shown along the vertical axis. The AD conversion section 11 calculates the reciprocal 1/THW of the headway THW from the accelerator pedal actuation amount S using the map of FIG. 9, and then calculates the target distance Dt using this calculated reciprocal 1/THW of the target time headway and the subject vehicle speed V1.

As shown in FIG. 9, within the range between a predetermined value Smin and another predetermined value Smax, the greater the accelerator pedal actuation amount S becomes, the greater does the reciprocal 1/THW of the target time headway THW become. In other words, the greater the accelerator pedal actuation amount S becomes within the predetermined range ($Smin \leq S \leq Smax$), the smaller does the target time headway THW become, and thus the smaller does the target distance Dt for performing the distance control become. The AD conversion section 11 outputs the target distance Dt which has been calculated to the DF conversion section 12.

The DF conversion section 12 calculates a target drive force Ftd so as to implement the target distance gap Dt which has been calculated by the AD conversion section 11, and outputs the target drive force Ftd which it has thus calculated to both the engine controller 2 and also the brake controller 3. This target drive force Ftd which is calculated by the DF conversion section 12 for performing the vehicle distance control is taken as a second target drive force.

Figure 10:
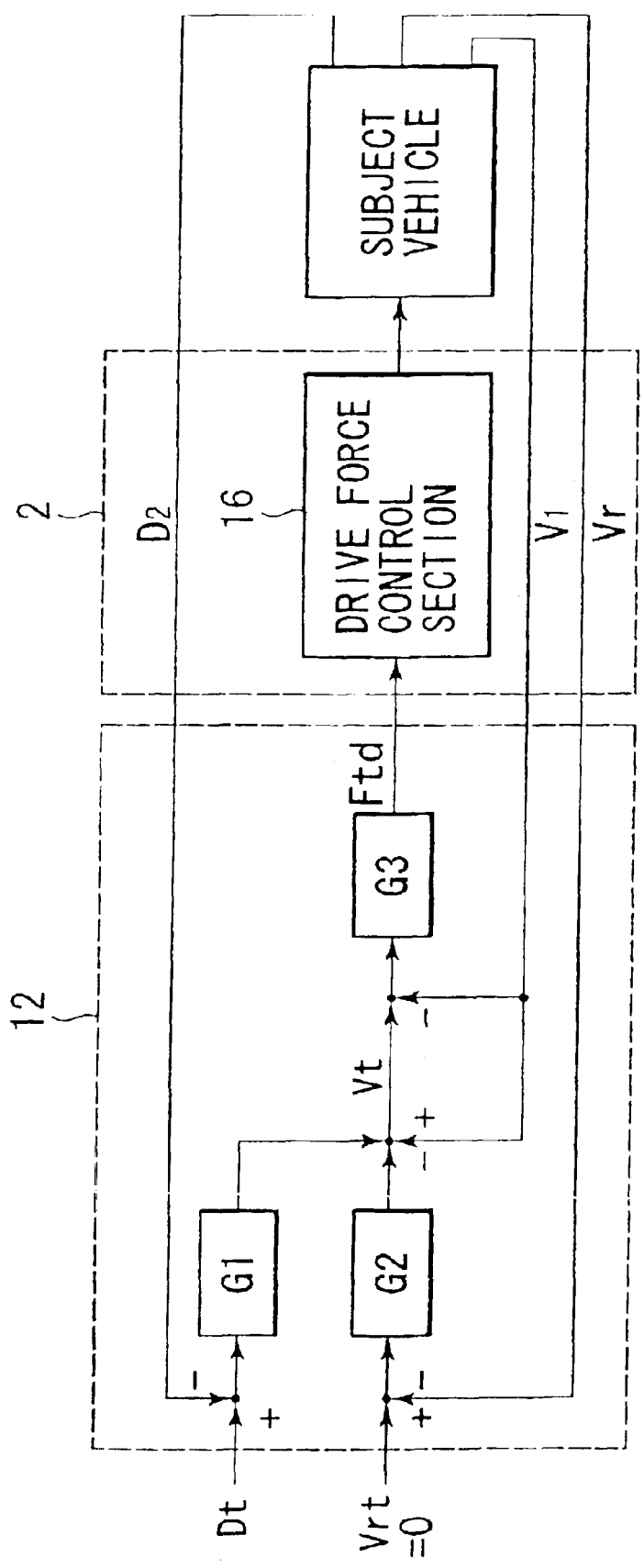
FIG. 10 is a block diagram for the vehicle distance control, in the first embodiment.

In FIG. 10 there is shown a block diagram of the vehicle distance control according to this first preferred embodiment. As shown in FIG. 10, the DF conversion section 12 calculates the difference between the target distance Dt which is being inputted from the AD conversion section 11 and the current vehicle distance D2 which is being detected by the laser radar 5, and performs a gain adjustment upon this difference signal by an adjuster G1. Furthermore, it calculates the difference between the target relative speed Vrt and the current relative speed Vr which is being detected by the laser radar 5, and performs a gain adjustment upon this difference signal by another adjuster G2. Since the subject vehicle maintains the target distance Dt during the vehicle distance control so as to follow after the preceding vehicle, the target relative speed Vrt is set to zero.

The DF conversion section 12 calculates a target speed Vt for implementing the target distance gap Dt, based upon the gain-adjusted difference between the target distance Dt and the actual distance D2, the gain-adjusted difference between the target relative speed Vrt and the actual relative speed Vr, and the actual subject vehicle speed V1 which is being detected by the speed sensor 6. Furthermore, based upon the target speed Vt which has been calculated and the subject vehicle speed V1, the DF conversion section 12 calculates a drive force so as to bring the subject vehicle speed V1 to agree with the target speed Vt, and then performs a gain adjustment upon this signal by another adjuster G3. The drive force upon which gain adjustment has been performed is outputted to the drive force control section 16 of the engine controller 2 as a second target drive force Ftd. It should be understood that this second target drive force Ftd is also outputted to the brake controller 3.

The drive force control section 16 of the engine controller 2 controls the throttle valve control motor 7 so as to implement the second target drive force Ftd which has been inputted from the DF conversion section 12, and thereby controls the drive force of the engine. It should be understood that an upper limit for this second target drive force Ftd which is set when performing the vehicle distance control is regulated, for example, to the first target drive force Fta for the drive force control performed when no preceding vehicle is present, which may be set using the current accelerator pedal actuation amount S and the current subject vehicle speed V1 at this time point.

If the second target drive force Ftd for the vehicle distance control is less than the available negative torque of the engine, in other words the engine braking force, it is necessary for the subject vehicle to generate a braking force. To this end, the deceleration control section 17 of the brake controller 3 supplies an electric current to the solenoid of the control booster 8, so as to apply the braking system of the vehicle by controlling the brake fluid pressure.

When the accelerator pedal actuation amount S goes from within the predetermined range to outside it, the changeover decision section 13 makes a decision to change over from the vehicle distance control to the drive force control. In concrete terms, when the accelerator pedal actuation amount S which is being detected by the accelerator pedal stroke sensor 4 falls below the predetermined threshold Smin, or when it rises above the predetermined threshold Smax, the changeover decision section 13 changes over the changeover switch 13A to its A side, and thereby changes over from the vehicle distance control to the drive force control which generates drive force in correspondence to the accelerator pedal actuation amount S.

As has been explained above, if a preceding vehicle for the subject vehicle to follow is present in front of the subject vehicle in its own vehicle lane, the main controller 1 controls the drive force or the deceleration of the subject vehicle so as to maintain the target distance Dt in correspondence to the accelerator pedal actuation amount S and thereby to follow the preceding vehicle in front, thus performing the vehicle distance control. Furthermore, if a preceding vehicle is present, the main controller 1 performs the accelerator pedal reaction force control according to the risk potential PF in the field around the subject vehicle. The risk potential PF for the subject vehicle becomes the greater, the greater is the degree of propinquity to the preceding vehicle. And the pedal reaction force AF which is generated for the accelerator pedal 19 is increased in correspondence to increase in the risk potential PF.

When the current situation shifts from the state in which no preceding vehicle is present in front of the subject vehicle to the state in which a preceding vehicle is present in front of the subject vehicle, due to, for example, another vehicle cutting in from an adjacent vehicle lane, or because the subject vehicle has caught up to a certain extent with a vehicle which was far in front, the system shifts from the drive force control to the vehicle distance control. At this time the risk potential PF increases from zero, and a reaction force increase amount $\Delta AF$ corresponding to this risk potential PF is added to the accelerator pedal reaction force AF. Due to this the accelerator pedal reaction force AF increases in a stepwise manner, and thereby the operator is apprised of the changeover of the control mode. From the moment that the system has shifted over to the vehicle distance control, the accelerator pedal reaction force AF is controlled based upon the risk potential PF which corresponds to the degree of propinquity to the preceding vehicle.

Figure 11:
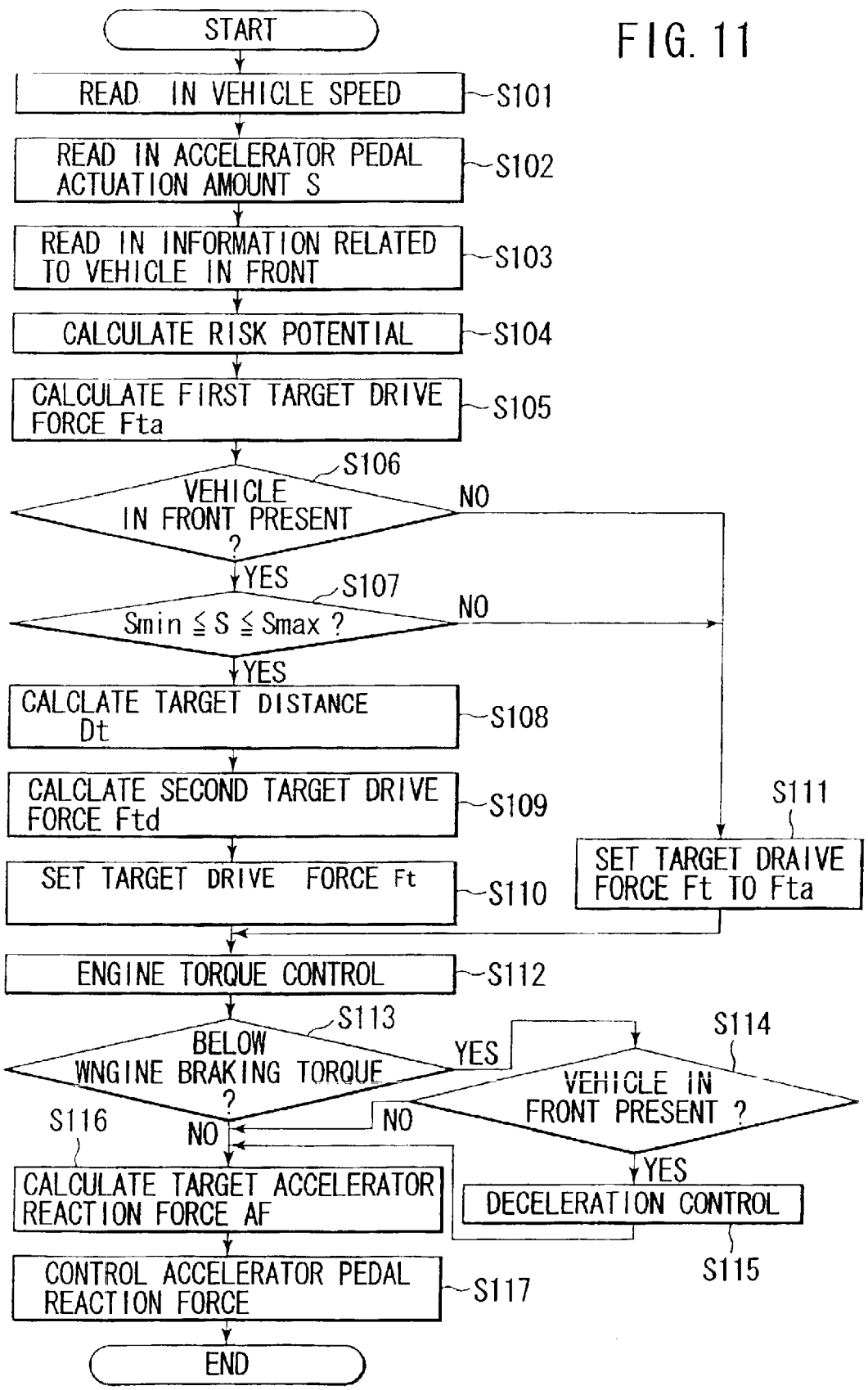
FIG. 11 is a flow chart showing the procedural flow of a driving assistance control program, in the first embodiment.

Next, the procedural flow of the accelerator pedal reaction force control, the drive force control, and the vehicle distance control which have been explained above will be explained with reference to FIG. 11. FIG. 11 is a flow chart showing a control procedure which is executed by the main controller 1 in this first preferred embodiment of the present invention. It should be understood that the following control procedure is repeatedly executed at intervals of, for example, 100 msec.

In step S101, the subject vehicle speed V1 which is being detected by the speed sensor 6 is read in, and next in step S102 the accelerator pedal actuation amount S which is being detected by the accelerator pedal stroke sensor 4 is read in. In step S103, the information related to the preceding vehicle which is being detected by the laser radar 5 is read in. The information related to the preceding vehicle includes whether or not any vehicle is present in front of the subject vehicle in its own vehicle lane, and, if such a vehicle is present in front, the vehicle distance D2 between the subject vehicle and the vehicle in front, and their relative speed V.

In step S104, the risk potential calculation section 14A calculates the risk potential PF for the subject vehicle using a map such as shown in FIG. 6 or in FIG. 7, based upon the subject vehicle speed V1 which was read in in step S101 and the information related to the preceding vehicle which was read in in step S103.

In step S105, the AF conversion section 10 calculates the first target drive force Fta based upon the subject vehicle speed V1 and the accelerator pedal actuation amount S which was read in in step S102. In step S106, the changeover decision section 13 makes a decision, from the information related to the preceding vehicle, as to whether or not a vehicle for the subject vehicle to follow is present in front of the subject vehicle. It should be understood that if, even though a vehicle is present in front of the subject vehicle in its own vehicle lane, the vehicle distance D2 between them is great, it is decided in this step that no vehicle after which the subject vehicle should follow exists. If an affirmative decision is made in this step S106, then the flow of control proceeds to step S107.

In this step S107, a decision is made as to whether or not the accelerator pedal actuation amount S is within the predetermined range Smin$\leq$S$\leq$Smax. If an affirmative decision is made in this step S107, then the flow of control proceeds to the next step S108. In step S108, the changeover decision section 13 changes over the changeover switch 13A to its B side, in order to perform the vehicle distance control. Furthermore, the AD conversion section 11 calculates the target distance Dt in correspondence to the accelerator pedal actuation amount S, using the map shown in FIG. 9.

In step S109, the DF conversion section 12 calculates the second target drive force Ftd so as to follow the preceding vehicle while maintaining the target distance Dt which was calculated in step S108, based upon the subject vehicle speed V1, the vehicle distance D2, and the relative speed Vr.

In step S110, the first target drive force Fta which was calculated in step S105 and the second target drive force Ftd which was calculated in step S109 are compared together. If the second target drive force Ftd is less than or equal to the first target drive force Fta, then the second target drive force Ftd is set as the actual target drive force Ft. On the other hand, if the second target drive force Ftd is greater than the first target drive force Fta, then the first target drive force Fta is set as the actual target drive force Ft.

On the other hand, if a negative decision is made in step S106 so that it is decided that no preceding vehicle is present, or if a negative decision is made in step S107 so that it is decided that the accelerator pedal actuation amount S is less than the predetermined lower threshold Smin or is greater than the predetermined upper threshold Smax, then the flow of control is transferred to step S111. In this step S111, the first target drive force Fta which was calculated in step S105 is set as the actual target drive force Ft.

In step S112, the target drive force Ft which was set in step S110 or in step S111 is outputted to the drive force control section 16 of the engine controller 2. The drive force control section 16 controls the driving of the throttle valve control motor 7 so as to implement the target drive force Ft which has been inputted. And in the next step S113 a decision is made as to whether or not this target drive force Ft is less than the negative torque of the engine, in other words is less than the engine braking torque.

If an affirmative decision is made in step S113, so that it is not possible to implement the target drive force Ft only by controlling the throttle position of the throttle valve 18 of the engine, then the flow of control proceeds to step S114. In this step S114, a decision is made as to whether or not a preceding vehicle to be followed is present in front of the subject vehicle. If an affirmative decision is made in step S114, then the flow of control proceeds to the next step S115 in which the target drive force Ft is outputted to the deceleration control section 17 of the brake controller 3. This deceleration control section 17 supplies an electrical current I to the solenoid of the control booster 8 so as to implement the target drive force Ft which has been inputted, and thereby controls the deceleration of the vehicle. After this, the flow of control proceeds to the next step S116. On the other hand, if a negative decision is made in step S113 or in step S116, then the flow of control is transferred directly to step S116.

In step S116, the reaction force calculation section 14 calculates the accelerator pedal reaction force AF based upon the risk potential PF which was calculated in step S104. In step S117, the reaction force control device 15 outputs a signal to generate the accelerator pedal reaction force AF which has been calculated in step S116 to the reaction force control motor 9. In response to the input signal, the reaction force control motor 9 controls its torque to control the reaction force to be generated for the accelerator pedal 19. After doing this, this episode of control processing terminates.

With the first preferred embodiment of the present invention as described above, the following advantages can be achieved.

(1) This driving assist system 100 for a vehicle performs control upon the vehicle by a combination of the vehicle distance control in which the distance to the preceding vehicle is controlled in correspondence to the accelerator pedal actuation amount S, and the accelerator pedal reaction force control in which an accelerator pedal reaction force AF is generated according to the risk potential PF. The operator is able to recognize the situation in the environment surrounding the subject vehicle from the variation of the accelerator pedal reaction force AF, without needing to rely only upon visual observation. Even when the vehicle distance control is being performed, since change in the traveling situation around the subject vehicle is reflected in the accelerator pedal reaction force AF, it is possible for the operator to sense such change in the reaction force and to perform appropriate brake actuation and steering actuation and the like quickly.

(2) The main controller 1 changes over, based upon the accelerator pedal actuation amount S, between the drive force control in which the drive force of the subject vehicle is controlled according to the accelerator pedal actuation amount S, and the vehicle distance control in which the distance to the preceding vehicle is controlled in correspondence to the accelerator pedal actuation amount S. By doing this, it is possible for the operator to perform driving actuation at his will while recognizing the situation in the environment surrounding the vehicle from the accelerator pedal reaction force AF.

(3) Since the risk potential PF is calculated based upon a vehicle condition and a traveling environment around the subject vehicle, in particular the vehicle distance D2 and the relative speed Vr to the preceding vehicle, an accelerator pedal reaction force AF is generated which reflects the changes in the behavior of the preceding vehicle. Thus the operator is able to perform appropriate driving actuation while accurately apprehending the situation in the environment of the subject vehicle from the accelerator pedal reaction force AF. For example, if the preceding vehicle has decelerated, or if another vehicle has pulled in between the preceding and the subject vehicle, the accelerator pedal reaction force AF increases due to increase in the risk potential PF caused by reduction of the vehicle distance D2 and change in the relative speed Vr. The operator is thus able to recognize changes in the vehicle traveling situation immediately, and can quickly respond to such changes of the vehicle traveling situation by performing brake actuation or the like.

(4) When a vehicle to be followed is present in front of the subject vehicle in its own vehicle lane, and moreover the accelerator pedal 19 is being stepped upon by an actuation amount S within the predetermined range Smin≦S≦Smax, the main controller 1 performs the vehicle distance control. And the main controller 1 performs the drive force control in other circumstances, in other words when no vehicle is present in front of the subject vehicle, or when, although a vehicle is present in front of the subject vehicle, the actuation amount of the accelerator pedal 19 is outside the aforesaid predetermined range. If it is considered that the risk potential PF is set to zero when there is no preceding vehicle present, then the risk potential PF is increased from zero when the situation shifts to one in which there is a preceding vehicle due to the intrusion of a vehicle from an adjacent vehicle lane or due to the subject vehicle catching up with a vehicle in front which previously was far away. Accordingly, the accelerator pedal reaction force AF is increased in a stepwise manner in correspondence to the degree of propinquity to the preceding vehicle, and it is possible for the operator to recognise the changeover of vehicle control mode. During the vehicle distance control, the drive force of the subject vehicle is controlled so that the subject vehicle follows along after the preceding vehicle while maintaining a vehicle distance which corresponds to the accelerator pedal actuation amount S. Therefore, it is possible for the operator to perform driving actuation at his will. Since the accelerator pedal reaction force AF is increased when the accelerator pedal 19 is stepped upon and the subject vehicle approaches the vehicle in front, it is possible for the operator easily to apprehend the change of the risk potential PF in the environment neighboring the subject vehicle. Since the system changes over to the drive force control when the accelerator pedal 19 is stepped upon exceeds the predetermined upper threshold Smax in the actuation amount S, it is possible to perform smooth driving actuation when in particular overtaking the vehicle in front. Since the accelerator pedal reaction force AF is generated according to the risk potential PF even when the vehicle distance control is cancelled, the operator is able to perform appropriate driving actuation while apprehending the traveling situation in the environment neighboring the subject vehicle from this accelerator pedal reaction force AF. If, due to deceleration of the preceding vehicle, for example, the vehicle distance D2 has changed, the drive force of the subject vehicle is controlled by generating a deceleration as required. Even if the target distance Dt which corresponds to the accelerator pedal actuation amount S is such that a value of deceleration is required which exceeds the upper limit value available in the system, the operator is able to recognize the risk potential PF from increase of the accelerator pedal reaction force AF, and is then able to perform appropriate brake actuation.

(5) The main controller 1 restricts the upper limit of the second target drive force Ftd which is set when performing the vehicle distance control to the first target drive force Fta for the drive force control which may be set using the current accelerator pedal actuation amount S and the current subject vehicle speed V1 at this time point. In other words, even if during the vehicle distance control the preceding vehicle accelerates and the vehicle distance D2 increases, the drive force which is generated by the subject vehicle is restricted. Therefore, if the preceding vehicle accelerates away from the subject vehicle and the system shifts from the vehicle distance control to the drive force control, the drive force which is generated by the subject vehicle does not diminish unnaturally, and accordingly a smooth shifting over of control is implemented.

(6) Since, during the vehicle distance control, the target distance Dt is set to become smaller, the greater does the accelerator pedal actuation amount S become, it is possible to perform control upon the subject vehicle to follow the preceding vehicle while maintaining the vehicle distance according to the operator's will. In particular, it is possible to perform smooth driving actuation while, for example, overtaking the vehicle in front.

-Second Embodiment-

In the following, the vehicle driving assist system according to the second preferred embodiment of the present invention will be explained with reference to the figures.

Figure 12:
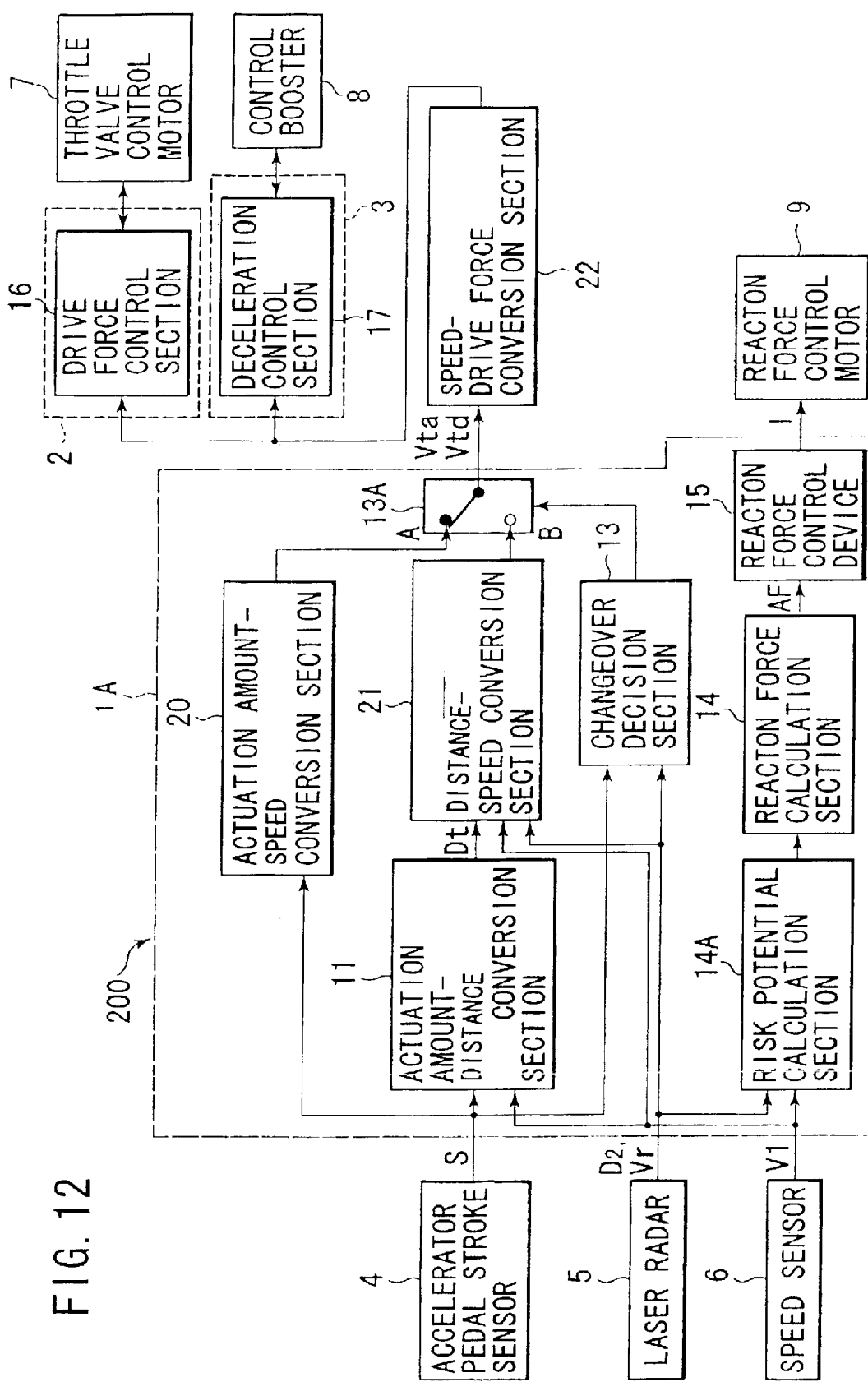
FIG. 12 is a figure showing the structure of a driving assist system for a vehicle, according to a second embodiment of the present invention.

FIG. 12 is a figure showing the structure of the vehicle driving assist system 200 according to this second preferred embodiment of the present invention. It should be understood that, in FIG. 12, elements which have the same functions as ones shown in FIG. 5 are designated by the same reference numerals. Here, explanations will focus upon the points in which this second preferred embodiment differs from the first preferred embodiment described above.

This vehicle driving assist system 200 according to this second preferred embodiment controls the drive force of the subject vehicle so that the vehicle speed V1 comes to be substantially equal to the target vehicle speed Vt which corresponds to the accelerator pedal actuation amount S. As shown in FIG. 12, the main controller 1A performs a speed control procedure with the actuation amount—speed conversion section (AS conversion section) 20, and performs a vehicle distance control procedure with the actuation amount—distance conversion section (AD conversion section) 11 and the distance—speed conversion section (DS conversion section) 21.

In the following, the operation of this vehicle driving assist system 200 according to this second preferred embodiment will be explained.

A main controller 1A performs the speed control if there is no vehicle to be followed present in front of the subject vehicle in the same vehicle lane. In concrete terms, the AS conversion section 20 calculates a target speed Vta based upon an accelerator pedal actuation amount S which is detected by an accelerator pedal stroke sensor 4. The characteristic of the target speed Vta with respect to the accelerator pedal actuation amount S is set appropriately in advance.

The AS conversion section 20 outputs the target speed Vta which has been calculated to a speed—drive force conversion section (SF conversion section) 22. This SF conversion section 22 calculates a target drive force Ft for implementing the target speed Vta which has been inputted, and outputs it to a drive force control section 16 of an engine controller 2. The target speed Vta for the speed control, which is calculated by the AS conversion section 20 is taken as a first target speed, and the target drive force Ft at this time is taken as a third target drive force.

On the other hand, the main controller 1A performs the vehicle distance control to follow the preceding vehicle while maintaining the target distance Dt in correspondence to the accelerator pedal operation amount S if a preceding vehicle is present in front of the subject vehicle, and moreover the accelerator pedal actuation amount S is within the predetermined range Smin≦S≦Smax. The actuation AD conversion section 11 calculates the target distance Dt based upon the accelerator pedal actuation amount S, and outputs this target distance Dt which has been calculated to the DS conversion section 21.

The DS conversion section 21 calculates a target speed Vtd for implementing the target distance Dt, based upon the target distance Dt, the subject vehicle speed V1, the vehicle distance D2, and the relative speed Vr. The target speed Vtd which has been calculated is outputted to the SF conversion section 22.

The SF conversion section 22 calculates a target drive force Ft for implementing the target speed Vtd which has been inputted from the DS conversion section 21. When performing the vehicle distance control, the target speed Vtd which is being calculated by the DS conversion section 21 is taken as a second target speed, and the target drive force at this time is taken as a fourth target drive force.

In this manner, the SF conversion section 22 calculates the third target drive force Ft according to the first target speed Vta, or the fourth target drive force Ft according to the second target speed Vtd.

Figure 13:
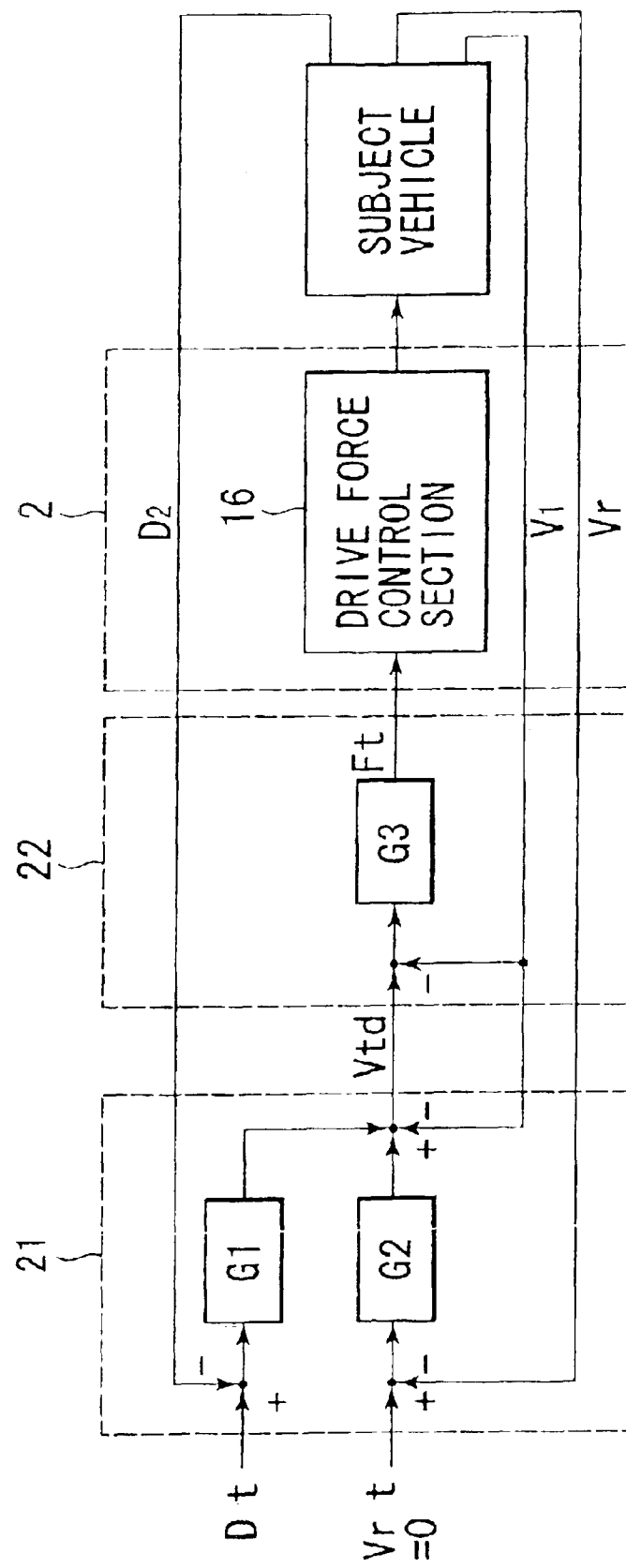
FIG. 13 is a block diagram for the vehicle distance control, in the second embodiment.

In FIG. 13 there is shown a block diagram of the vehicle distance control according to this second preferred embodiment. As shown in FIG. 13, the DS conversion section 21 calculates the difference between the target distance Dt which is being inputted from the AD conversion section 11 and the current vehicle distance D2 which is being detected by the laser radar 5, and performs a gain adjustment upon this difference signal using an adjuster G1. Furthermore, the DS conversion section 21 calculates the difference between the target relative speed Vrt (which equals zero) and the actual current relative speed Vr which is being detected by the laser radar 5, and performs a gain adjustment upon this difference signal using another adjuster G2.

The DS conversion section 21 calculates a second target speed Vtd for implementing the target distance Dt, based upon the gain-adjusted difference between the target distance Dt and the actual vehicle distance D2, the gain-adjusted difference between the target relative speed Vrt and the actual relative speed Vr, and the actual current subject vehicle speed V1 which is being detected by the speed sensor 6.

The SF conversion section 22 calculates a drive force, based upon the second target speed Vtd and the subject vehicle speed V1 so as the subject vehicle speed V1 to agree with the second target speed Vtd, and performs gain adjustment upon this signal using another adjustor G3. The SF conversion section 22 outputs the fourth drive force which has been calculated to the drive force control section 16 of the engine controller 2 as a target drive force Ft. It should be understood that this target drive force Ft is also outputted to the deceleration control section 17 of the brake controller 3.

The drive force control section 16 controls the driving of the throttle valve control motor 7 so as to implement the target drive force Ftd which has been inputted, and thereby controls the drive force of the engine. It should be understood that an upper limit for the second target speed Vtd for the vehicle distance control is set, for example, to the first target speed Vta which may be set based upon the current accelerator pedal actuation amount S and the current subject vehicle speed V1 for the drive force control which is performed when no preceding vehicle is present.

As has been explained with regard to the first preferred embodiment of the present invention, the main controller 1A performs the speed control or the vehicle distance control along with the accelerator pedal reaction force control according to the risk potential PF in the environment surrounding the subject vehicle.

Figure 14:
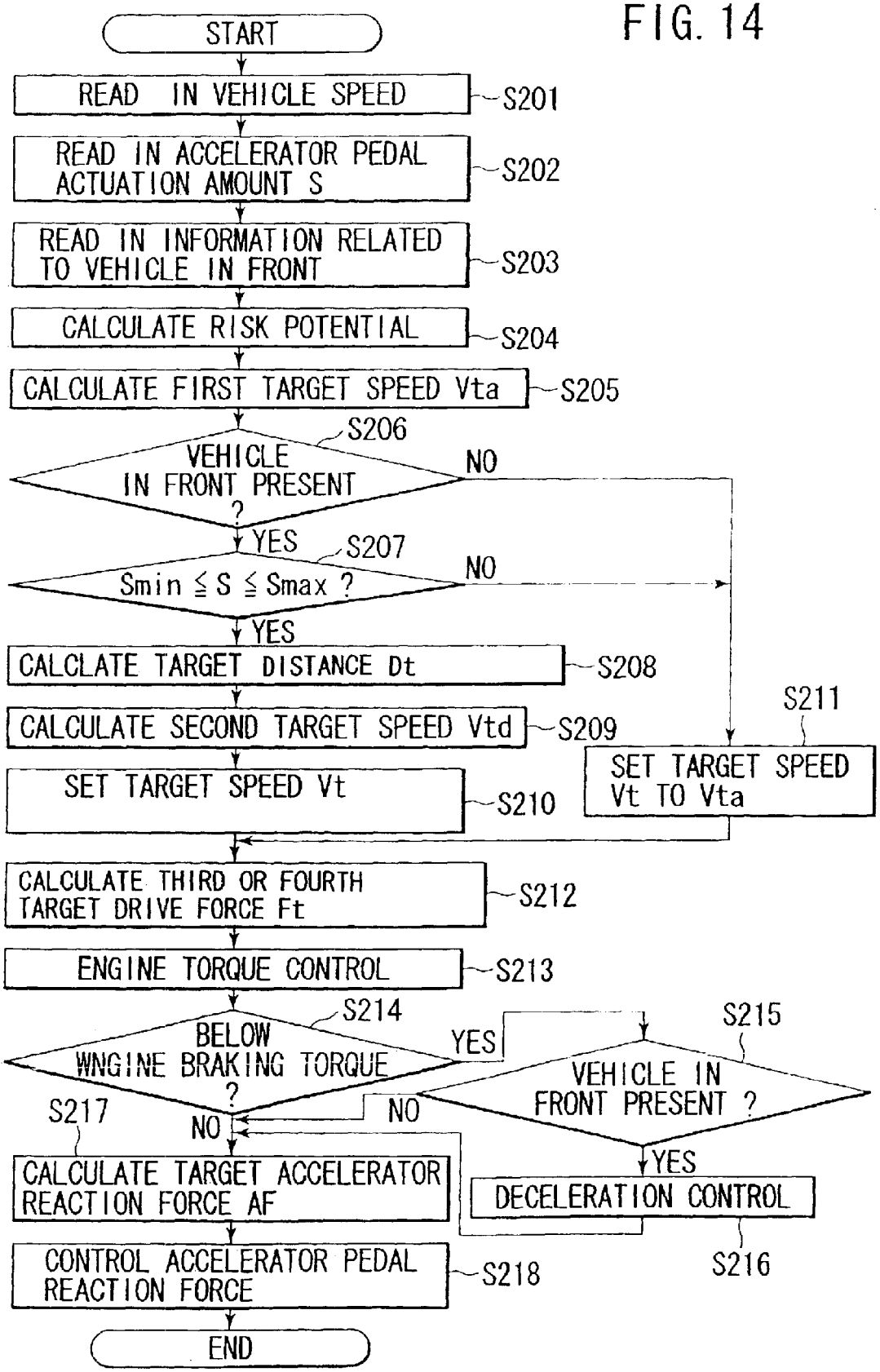
FIG. 14 is a flow chart showing the procedural flow of a driving assistance control program, in the second embodiment.

Next, the procedural flow of the accelerator pedal reaction force control, the speed control, and the vehicle distance control which have been explained above will be explained with reference to FIG. 14. FIG. 14 is a flow chart showing a control procedure which is executed by the main controller 1A and the SF conversion section 22 in this second preferred embodiment of the present invention. It should be understood that this control procedure is repeatedly executed at time intervals of, for example, 100 msec.

The procedure performed in steps S201 through S204 is the same as the procedure performed in steps S101 through S104 of the first preferred embodiment of the present invention shown in the flow chart of FIG. 11, and accordingly their description is herein curtailed.

In step S205, the AS conversion section 20 calculates the first target speed Vta according to the accelerator pedal actuation amount S which was read in in step S202. In step S206, the changeover decision section 13 makes a decision, based upon the information related to the preceding vehicle which was read in in step S203, as to whether or not a preceding vehicle to be followed is present in front of the subject vehicle in its own vehicle lane. If an affirmative decision is made in step S206, then the flow of control proceeds to step S207.

In this step S207, a decision is made as to whether or not the accelerator pedal actuation amount S is within the predetermined range $Smin \leq S \leq Smax$. If an affirmative decision is made in this step S207, then the flow of control proceeds to the next step S208. In this step S208, the changeover decision section 13 changes over the changeover switch 13A to its B side, in order to perform the vehicle distance control. Furthermore, the AD conversion section 11 calculates the target distance Dt in correspondence to the accelerator pedal actuation amount S.

In step S209, the DS conversion section 21 calculates the second target speed Vtd so as to follow the preceding vehicle while maintaining the target distance Dt which was calculated in step S208, based upon the current vehicle distance D2 and the relative speed Vr to the preceding vehicle.

In step S210, the first target speed Vta which was calculated in step S205 and the second target speed Vtd which was calculated in step S209 are compared together. If the second target speed Vtd when performing the vehicle distance control is less than or equal to the first target speed Vta for the speed control, then the second target speed Vtd is set as the actual target speed Vt. On the other hand, if the second target speed Vtd is greater than the first target speed Vta, then the first target speed Vta is set as the actual target speed Vt.

If a negative decision is made in step S206 or in step S207, then the flow of control is transferred to step S211, and the first target speed Vta is set as the actual target speed Vt.

In step S212, the SF conversion section 22 calculates a target drive force Ft for implementing the target speed Vt which was set in step S210 or in step S211.

Explanation of the following procedure of steps S213 through S218 is curtailed, since it is the same as the procedure of steps S112 through S117 of the FIG. 11 flow chart.

With the second preferred embodiment of the present invention as described above, the following advantages can be achieved.

(1) When a vehicle to be followed is present in front of the subject vehicle in its own vehicle lane, and moreover the accelerator pedal 19 is being stepped on by an actuation amount S which falls within the predetermined range $Smin \leq S \leq Smax$, then the main controller 1A performs the vehicle distance control. On the other hand, in other circumstances, the main controller 1A performs the speed control. The drive force of the vehicle is controlled so as to implement the target speed Vta according to the accelerator pedal actuation amount S if no preceding vehicle to be followed is present. Therefore, when the accelerator pedal actuation amount S is constant, it is possible to perform control so that the subject vehicle runs approximately at a constant speed. When performing the vehicle distance control, the main controller 1A calculates the target speed Vtd so as to implement the target distance Dt according to the accelerator pedal actuation amount S, and calculates the target drive force in accordance with target speed Vtd to control the drive force of the vehicle. Since a reaction force AF is generated for the accelerator pedal 19 according to the risk potential PF in the environment surrounding the subject vehicle, the operator is able easily to recognize changes in the risk potential PF.

Since during the vehicle distance control it is possible for the operator continuously to recognize the risk potential PF as the accelerator pedal reaction force AF, accordingly the operator is able quickly to perform appropriate actuation such as brake actuation or the like, even if the traveling situation has changed due to deceleration of the preceding vehicle or another vehicle cutting in in front of the subject vehicle. Furthermore, since the subject vehicle is caused to slow down as required, it is possible to perform the vehicle distance control reliably. Since, when shifting from the speed control state to the vehicle distance control state, the risk potential PF is increased from zero and the accelerator pedal reaction force AF varies in a stepwise manner, accordingly the operator is easily able to recognize that the control mode has shifted.

(2) The upper limit of the target speed Vtd for the vehicle distance control is regulated to the target speed Vta for the speed control which may be set according to the current accelerator pedal actuation amount S at this time point. Accordingly, the vehicle speed is limited, even if, during the vehicle distance control, the preceding vehicle accelerates away from the subject vehicle so that the vehicle distance to the preceding vehicle increases. As a result, there is no diminution of speed when the vehicle in front pulls away from the subject vehicle and the system shifts from the vehicle distance control to the speed control, and accordingly it is possible to shift control mode smoothly.

-Third Embodiment-

In the following, the driving assist system for a vehicle according to the third preferred embodiment of the present invention will be explained. The structure of the vehicle driving assist system according to this third preferred embodiment is the same as that of the first preferred embodiment shown in FIG. 5. Here, explanations will focus upon the points in which this third preferred embodiment differs from the first preferred embodiment described above.

With this third preferred embodiment, the definition of the risk potential PF is varied between the vehicle distance control and the other type of control, i.e. drive force control. In the following, the setting of the risk potential PF for each type of control will be explained.

When no vehicle after which the subject vehicle should follow is present in front of the subject vehicle in its own vehicle lane, so that the drive force control is being performed according to the accelerator pedal actuation amount S, then, the risk potential PF is set using the map such as shown in FIG. 6 or FIG. 7 in the same way as in the first preferred embodiment. It should be understood that, if no preceding vehicle is present, the risk potential PF is set to zero, assuming that, for example, the time to contact TTC and the time headway THW are infinite.

On the other hand, when the vehicle distance control is being performed according to the accelerator pedal actuation amount S, the risk potential PF is defined as a predicted value in the future. As described above, in the vehicle distance control, the target distance Dt is set according to the accelerator pedal actuation amount S, and the drive force of the vehicle is controlled so as to maintain the target distance Dt.

The distance from the subject vehicle to the preceding vehicle shall be maintained by performing this vehicle distance control, and accordingly, it is predicted that the risk potential PF for the subject vehicle will diminish in the future. Here, when calculating the risk potential PF, a time headway THW is calculated using the accelerator pedal actuation amount S instead of the present vehicle distance D2.

In concrete terms, the future time headway THW is predicted using the subject vehicle speed V1 and the target distance Dt which is set based upon the accelerator pedal actuation amount S. It should be understood that it would also be possible to calculate the reciprocal 1/THW of the time headway THW directly from the accelerator pedal actuation amount S, using the map shown in FIG. 9. Furthermore, the relative speed Vr for performing the vehicle distance control is taken as zero, so that the time to contact TTC is set to be infinite. Based upon the time headway THW and the time to contact TTC which have been set as above, the risk potential calculation section 14A calculates the predicted future risk potential PF according to the risk potential map shown in FIG. 7.

By calculating the risk potential PF based upon the target distance Dt in this manner, it is possible to predict the future risk potential PF while the vehicle distance control is being performed, irrespective of the current behavior of the preceding vehicle.

The reaction force calculation section 14 calculates the accelerator pedal reaction force AF according to the risk potential PF which has been calculated by the risk potential calculation section 14A. The reaction force control device 15 controls the reaction force control motor 9 so as to generate the accelerator pedal reaction force AF which has been calculated by the reaction force calculation section 14.

Accordingly, when the vehicle distance control is performed, an accelerator pedal reaction force AF is generated for the accelerator pedal 19 according to the future risk potential PF, which is based upon the accelerator pedal actuation amount S, in other words the target distance Dt. As a result, even if the vehicle distance control by the main controller 1 can not follow the erratic speed variation of the preceding vehicle, which causes the actual vehicle distance to vary temporarily, the accelerator pedal reaction force AF does not experience any influence from this change in the vehicle distance, but is generated in a stable manner.

With the third preferred embodiment of the present invention as described above, the following advantages can be achieved. When performing the vehicle distance control, the risk potential PF for the subject vehicle is set as a predicted future value thereof. When the vehicle distance control is continued, the vehicle distance to the preceding vehicle will be maintained and the risk potential PF can be predicted to decrease gradually. By setting the predicted future risk as the risk potential PF, change of the risk potential PF is restrained, even if the preceding vehicle speed is not stable. Accordingly, changes of the accelerator pedal reaction force AF are reduced, and it is possible to suppress changes of the accelerator pedal actuation amount S of which the operator is unconscious attributable to change in the pedal reaction force AF. Due to this, unplanned changes of the target distance Dt corresponding to the accelerator pedal actuation amount S are suppressed even if the preceding vehicle undergoes behavioral changes, and it is possible to perform the vehicle distance control while maintaining a stabilized vehicle distance.

If the accelerator pedal 19 has been actuated by an amount which is below the predetermined lower threshold Smin, or if the accelerator pedal 19 has been stepped upon by an amount which is greater than the predetermined higher threshold Smax, the vehicle distance control is cancelled. Accordingly, the risk potential PF to be calculated changes over from the future predicted value to the present risk potential PF. For example, when the accelerator pedal 19 is fully stepped upon to overtake the vehicle in front, a pedal reaction force AF is generated according to the current risk potential PF, so that the operator is enabled reliably to recognize the risk potential in the environment surrounding the subject vehicle.

-Fourth Embodiment-

In the following, the driving assist system for a vehicle according to the fourth preferred embodiment of the present invention will be explained. The structure of the vehicle driving assist system according to this fourth preferred embodiment is the same as that of the first preferred embodiment shown in FIG. 5. Here, explanations will focus upon the points in which this fourth preferred embodiment differs from the first preferred embodiment described above will be explained.

In this fourth preferred embodiment of the present invention, the characteristic of the target distance Dt for the vehicle distance control is set so that, even if the accelerator pedal actuation amount S varies, the target distance Dt does not change in some region, in other words it has insensitive or dead zones with respect to change in the accelerator pedal actuation amount S.

Figure 15:
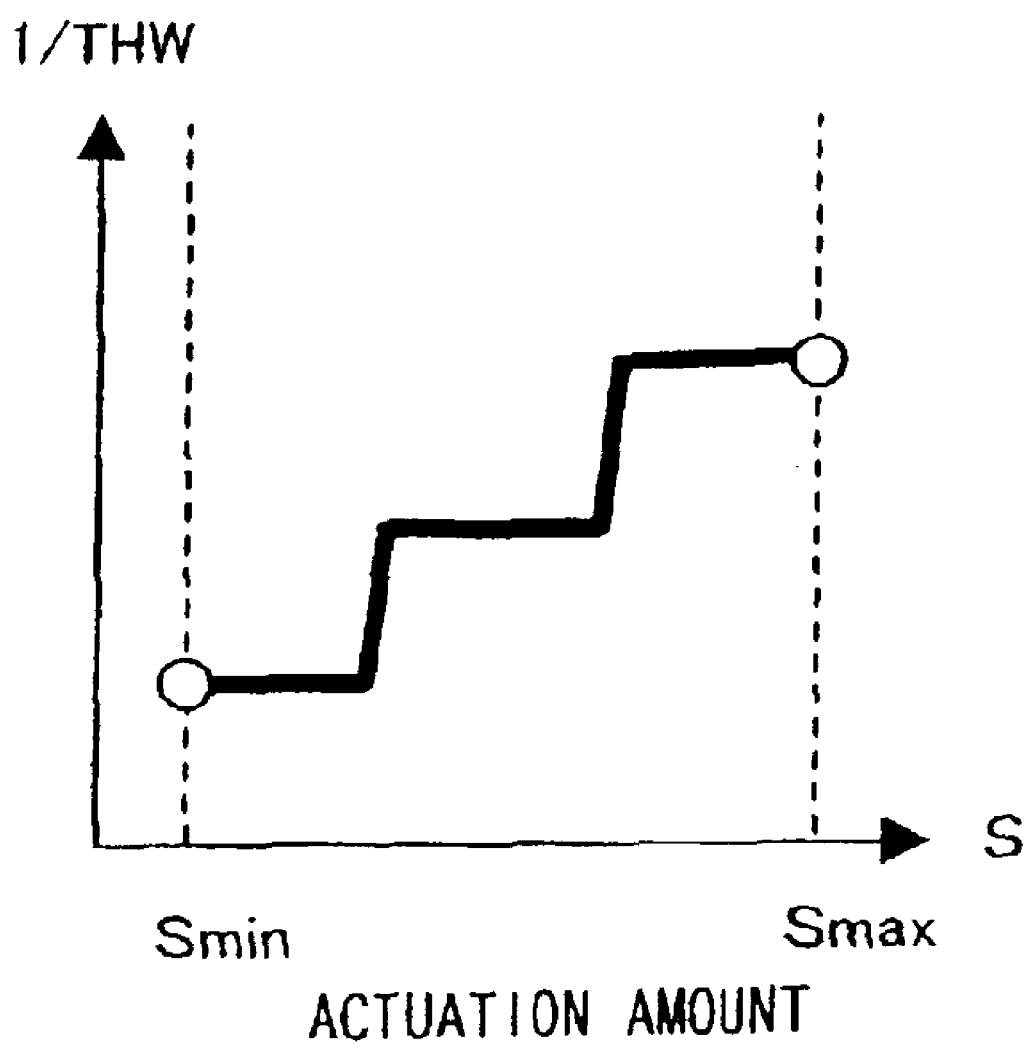
FIG. 15 is a figure for setting the target vehicle distance with respect to accelerator pedal actuation amount, according to a fourth embodiment.

FIG. 15 shows an example of a map for calculating the target distance Dt based upon the accelerator pedal actuation amount S. It should be understood that, in FIG. 15, the accelerator pedal actuation amount S is shown along the horizontal axis, while the reciprocal 1/THW of the target time headway THW is shown along the vertical axis. The AD conversion section 11 calculates the reciprocal 1/THW of the target time headway THW from the accelerator pedal actuation amount S using the map of FIG. 15, and calculates the target distance Dt using the subject vehicle speed V1 and this reciprocal 1/THW of the target time headway which has been calculated.

As shown in FIG. 15, the greater does the accelerator pedal actuation amount S become within the predetermined range (Smin≦S≦Smax), the greater does the reciprocal 1/THW of the target time headway become, in a stepwise manner. In other words, the greater does the accelerator pedal actuation amount S become within the predetermined range, the smaller does the target time headway THW become, in a stepwise manner, and, accordingly, the smaller does the target distance Dt for the vehicle distance control become, in a stepwise manner. In this way, the target distance Dt exhibits a characteristic having insensitive or dead zones in which it does not change even if the accelerator pedal actuation amount S varies, so that the target distance Dt varies in a stepwise manner with respect to the accelerator pedal actuation amount S.

The AD conversion section 11 calculates the target distance Dt according to the accelerator pedal actuation amount S based upon the map shown in FIG. 15, and outputs the target distance Dt which it has thus calculated to the DF conversion section 12.

When the vehicle distance control is being performed, if the risk potential PF changes due to temporary change of the vehicle distance D2 to the preceding vehicle from the subject vehicle, the accelerator pedal reaction force AF is caused to change. Even if the accelerator pedal actuation amount S changes along with this change in the accelerator pedal reaction force AF, since the dead region or zone is set in which the target distance Dt does not change in correspondence to this change of the accelerator pedal actuation amount S, accordingly it is possible to suppress changes in the vehicle distance D2 which are not according to the will of the driver.

With the fourth preferred embodiment of the present invention as described above, the following advantages can be achieved. The target distance Dt is set so that the target distance Dt changes in a stepwise manner, having insensitive or dead zones in which it does not change even if the accelerator pedal actuation amount S changes. When the preceding vehicle speed becomes unstable during the vehicle distance control, the risk potential PF changes, and the accelerator pedal reaction force AF then changes in correspondence to this change of the risk potential PF. Even if the accelerator pedal actuation amount S changes due to this change of the accelerator pedal reaction force AF, it is nevertheless possible to perform the vehicle distance control while reliably maintaining the vehicle distance, since unintentional changes of the target distance Dt are thus suppressed.

-Fifth Embodiment-

Figure 16:
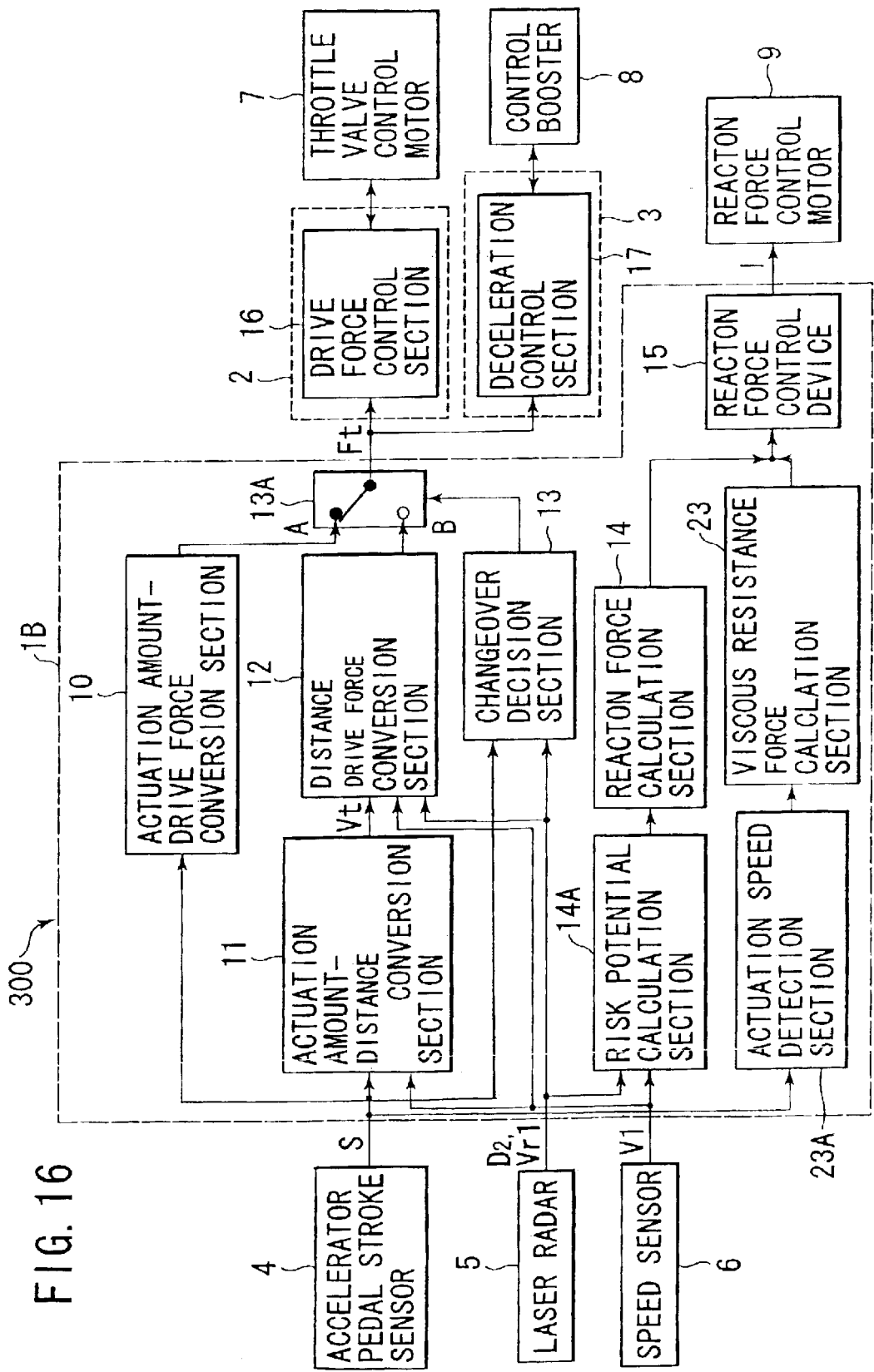
FIG. 16 is a figure showing the structure of a driving assist system for a vehicle, according to a fifth embodiment of the present invention.

In the following, the driving assist system for a vehicle according to the fifth preferred embodiment of the present invention will be explained with reference to the figures. FIG. 16 is a figure showing the structure of the vehicle driving assist system 300 according to this fifth preferred embodiment of the present invention. It should be understood that, in FIG. 16, elements which have the same functions as ones shown in FIG. 5 are designated by the same reference numerals. Here, explanations will focus upon the points in which this fifth preferred embodiment differs from the first preferred embodiment described above.

In this fifth preferred embodiment, in the accelerator pedal reaction force control, the calculation method for the accelerator pedal reaction force AF is varied according to whether the vehicle distance control, or some other type of control, in other words the drive force control, is being performed.

When performing the drive force control, in the same manner as with the above described first preferred embodiment, the risk potential PF is calculated by a risk potential calculation section 14A, and the target reaction force AF is calculated by the reaction force calculation section 14 according to the risk potential PF. The reaction force control device 15 controls the reaction force control motor 9 so as to generate the target reaction force AF for the accelerator pedal 19 which has been calculated by the reaction force calculation section 14.

On the other hand, when performing the vehicle distance control, along with calculating a main component of the accelerator pedal reaction force according to the risk potential PF, a subsidiary component of the accelerator pedal reaction force is further calculated according to the actuation speed of the accelerator pedal 19.

When performing the vehicle distance control, the reaction force calculation section 14, in the same manner as when performing the drive force control, calculates an accelerator pedal reaction force AFr (the above-mentioned main component of the accelerator pedal reaction force) according to the risk potential PF which has been calculated by the risk potential calculation section 14A.

An actuation speed detection section 23A calculates the actuation speed wa of the accelerator pedal 19 based upon the accelerator pedal actuation amount S which is being inputted from the accelerator pedal stroke sensor 4, and outputs this accelerator pedal actuation speed wa which has thus been calculated to a viscous resistance force calculation section 23. This viscous resistance force calculation section 23 calculates an accelerator pedal reaction force AFw (the above-mentioned subsidiary component of the accelerator pedal reaction force) based upon the accelerator pedal actuation speed wa which has thus been inputted. This accelerator pedal reaction force AFw based upon the actuation speed wa of the accelerator pedal 19 may be given by the following [Equation 4], where c is a constant:

$$AFw = c \times wa \quad \text{[Equation 4]}$$

As already shown in FIG. 3, a spring 20 is provided at the rotational axis of the accelerator pedal 19. The pedal reaction force AFw which is calculated by the viscous resistance force calculation section 23 corresponds to a resistance force which is generated for the accelerator pedal 19 by the spring 20 and the friction generated around the rotational axis or the like, in other words to the viscous resistance force.

The reaction force control device 15 adds together the pedal reaction force AFr which is inputted from the reaction force calculation section 14A corresponding to the risk potential PF, and the pedal reaction force AFw which is inputted from the viscous resistance force calculation section 23, and outputs their sum to the reaction force control motor 9 as the target reaction force AF.

In this manner, when performing the vehicle distance control, a target reaction force AF is generated for the accelerator pedal 19, in which the pedal reaction force AFw corresponding to the accelerator pedal actuation speed wa is added to the pedal reaction force AFr corresponding to the risk potential PF. In other words, if, during the vehicle distance control, the preceding vehicle speed varies irregularly and the vehicle distance temporarily changes, although the risk potential PF changes and accordingly the pedal reaction force AFr which corresponds to the risk potential PF also changes, the pedal reaction force AFw is generated to compensate for this change. By doing this, changes of the actual reaction force AF which is generated for the accelerator pedal 19 are suppressed. As a result, it is possible to suppress changes of the accelerator pedal actuation amount S, so that it is possible to anticipate stability of the vehicle distance by suppressing changes of the vehicle distance which are not intentional.

Figure 17:
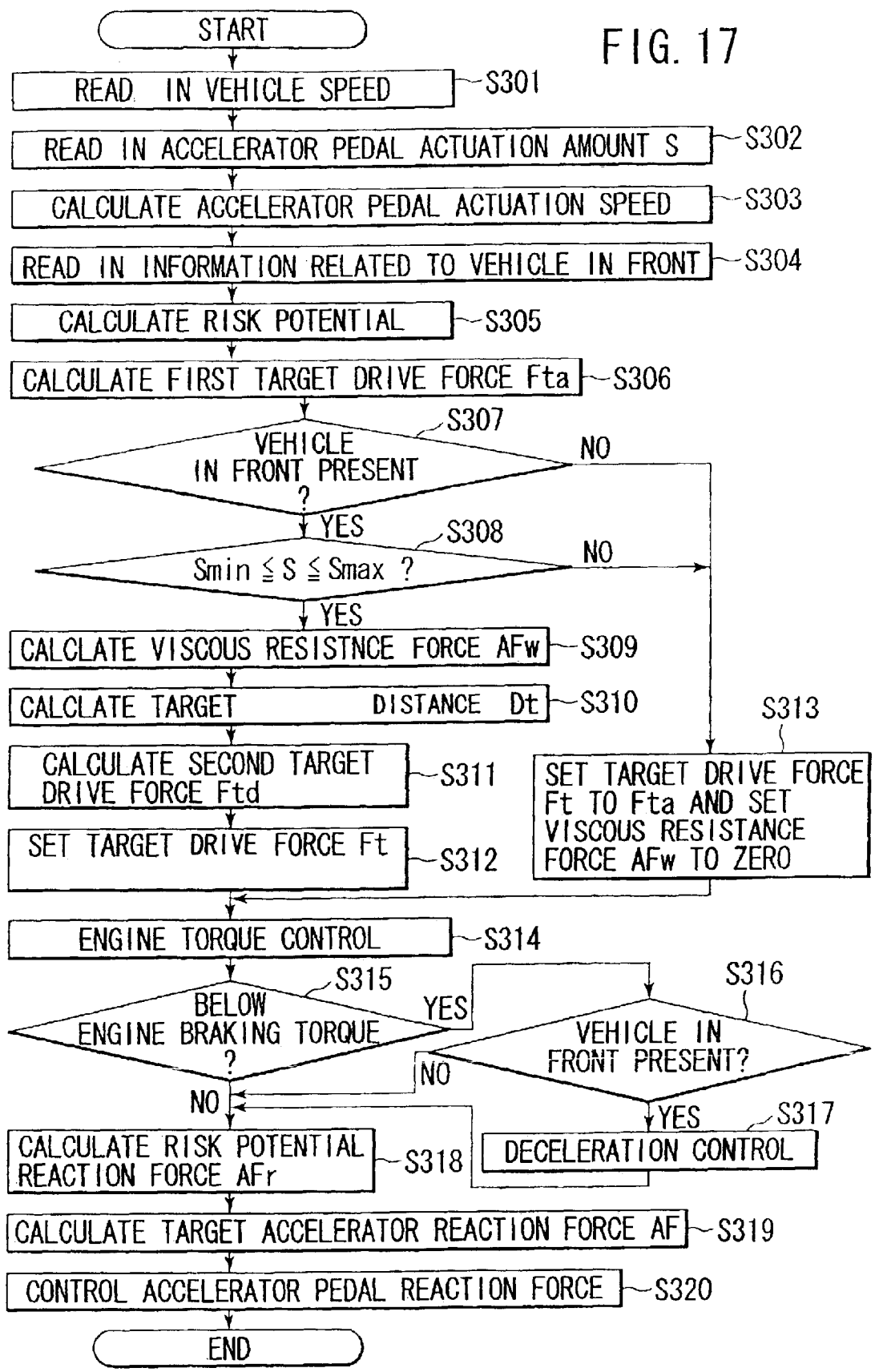
FIG. 17 is a flow chart showing the procedural flow of a driving assistance control program, in the fifth embodiment.

Next, the procedural flow of the accelerator pedal reaction force control, the drive force control, and the vehicle distance control which have been explained above will be explained with reference to FIG. 17. FIG. 17 is a flow chart showing a control procedure which is executed by the main controller 1B in this fifth preferred embodiment of the present invention. It should be understood that the control procedure is repeatedly executed at time intervals of, for example, 100 msec.

In step S301, the subject vehicle speed V1 is read in, and in step S302 the accelerator pedal actuation amount S is read in. In step S303 the actuation speed detection section 23A calculates the actuation speed wa of the accelerator pedal 19 based upon the accelerator pedal actuation amount S which was read in in step S302. The actuation speed detection section 23A may, for example, store the accelerator pedal actuation amount which was detected in the previous episode of this procedure in a memory of the main controller 1B, and may calculate the actuation speed wa from this stored actuation amount and the present actuation amount.

In step S304, the information related to the preceding vehicle which is being detected by the laser radar 5 is read in. In step S305, the risk potential calculation section 14A calculates the risk potential PF for the subject vehicle based upon the subject vehicle speed V1 which was read in in step S301, and the information related to the preceding vehicle which was read in in step S304.

In step S306, the AS force conversion section 10 calculates a first target drive force Fta based upon the subject vehicle speed V1 and the accelerator pedal actuation amount S. In step S307, the changeover decision section 13 makes a decision, from the information related to the preceding vehicle, as to whether or not a vehicle to be followed is present in front of the subject vehicle. If an affirmative decision is made in this step S307, then the flow of control proceeds to the next step S308.

In this step S308, a decision is made as to whether or not the accelerator pedal actuation amount S is within the predetermined range $Smin \leq S \leq Smax$. If an affirmative decision is made in this step S308, then the flow of control proceeds to the next step S309.

In step S309, the viscous resistance force calculation section 23 calculates the viscous resistance force AFw based upon the accelerator pedal actuation speed wa which was calculated in step S303.

In step S310, the changeover decision section 13 changes over the changeover switch 13A to its B side, in order to perform the vehicle distance control. Furthermore, the AD conversion section 11 calculates the target distance Dt in correspondence to the accelerator pedal actuation amount S. And in step S311, the DF conversion section 12 calculates the second target drive force Ftd so as to follow the preceding vehicle while maintaining the target distance Dt which was calculated in step S310, based upon the subject vehicle speed V1, the vehicle distance D2, and the relative speed Vr.

In step S312, the first target drive force Fta which was calculated in step S306 and the second target drive force Ftd which was calculated in step S311 are compared together, and the actual target drive force Ft is set.

If a negative decision is made in step S307 or in step S308, then the flow of control is transferred to step S313. In this step S313, the first target drive force Fta which was calculated in step S306 is set as the actual target drive force Ft, and furthermore the viscous resistance force AFw is set to zero.

In step S314, the target drive force Ft which was set in step S312 or in step S313 is outputted to the drive force control section 16 of the engine controller 2. And in the next step S315 a decision is made as to whether or not this target drive force Ft is less than the negative torque of the engine, in other words is less than the engine braking torque. If an affirmative decision is made in step S315, then the flow of control proceeds to the step S316, in which a decision is made as to whether or not a vehicle to be followed is present in front of the subject vehicle. If an affirmative decision is made in step S316, then the flow of control proceeds to the next step S317, in which the target drive force Ft is outputted to the deceleration control section 17 of the brake controller 3.

In step S318, the reaction force calculation section 14A calculates the accelerator pedal reaction force AFr corresponding to the risk potential, based upon the risk potential PF which was calculated in step S305. And in the next step S319, the target reaction force AF is calculated by adding together the reaction force AFr which was calculated in step S318 in correspondence with the risk potential PF, and the viscous resistance force AFw which was calculated in step S309 or in step S313. In the next step S320, the reaction force control device 15 outputs a signal to the reaction force control motor 9 to generate this target reaction force AF. Then this episode of the processing terminates.

With the fifth preferred embodiment of the present invention as described above, the following advantages can be achieved. During the vehicle distance control, the pedal reaction force AFw is calculated according to the accelerator pedal actuation speed wa, and the value (AFr+AFw) which is obtained by adding together the pedal reaction force AFr which corresponds to the risk potential PF and the reaction force AFw is set as the accelerator pedal reaction force AF.

By doing this, even if the preceding vehicle speed during the vehicle distance control is not stable, and accordingly the risk potential PF and the accelerator pedal reaction force AFr which corresponds to the risk potential PF vary, the pedal reaction force AFw which corresponds to the pedal actuation speed wa is additionally applied to the accelerator pedal 19. For example, if the preceding vehicle speed increases so that the vehicle distance D2 increases, the risk potential PF decreases and the accelerator pedal reaction force AFr thus decreases. Due to the reduction of the reaction force AFr which corresponds to the risk potential PF, the operator may unconsciously step upon the accelerator pedal 19, however, it is possible to suppress this stepping on of the accelerator pedal 19, because during this stepping on action the sum of the pedal reaction force AFw which corresponds to the accelerator pedal actuation speed wa and the reaction force AFr which corresponds to the risk potential PF is generated as the accelerator pedal reaction force AF.

Conversely, if due to reduction of the vehicle distance D2 the risk potential PF becomes larger and the accelerator pedal reaction force AFr increases, the negative pedal reaction force AFw which corresponds to the actuation speed wa when the accelerator pedal is actuated in the release direction is added to it. Therefore, the pedal reaction force diminishes when the accelerator pedal 19 is actuated in the release direction. By adding the pedal reaction force AFw which corresponds to the pedal actuation speed wa in this manner, it is possible to suppress variation of the accelerator pedal actuation amount S, and accordingly it is possible to perform the vehicle distance control while reliably maintaining a vehicle distance, without causing the target distance Dt to vary unintentionally.

The driving assist system for a vehicle according to the present invention is not to be considered as being limited to the first through the fifth preferred embodiments disclosed above; it may incorporate various modifications.

For example, it would also be possible to apply the relationship between the accelerator pedal actuation amount S and the target distance Dt which was set in the fourth preferred embodiment of the present invention using the map shown in FIG. 15, to the third preferred embodiment. As described above, in the third preferred embodiment, the risk potential PF for the vehicle distance control is set as a value based upon the target distance Dt. Thus, by using the map of FIG. 15, the risk potential PF during the vehicle distance control varies in a stepwise manner according to change of the accelerator pedal actuation amount S. Due to this, the accelerator pedal reaction force AF varies in a stepwise manner with respect to change of the accelerator pedal actuation amount S. The operator is able to recognize change of the risk potential PF from such change in the accelerator pedal reaction force AF, he is also able easily to realize which level is selected of the target distance Dt which is set in this stepwise manner.

Furthermore, in the fourth preferred embodiment of the present invention, the map for calculating the target distance Dt from the accelerator pedal actuation amount S is not to be considered as being limited to the map shown in FIG. 15. For example, in FIG. 15, it would be possible to vary the widths of the regions in which the reciprocal 1/THW of the time headway THW does not vary with respect to the accelerator pedal actuation amount S.

Although, in the above described first through fifth preferred embodiments of the present invention, the target reaction force increase amount ΔF was set in correspondence to the risk potential PF using the map of FIG. 6, the present invention is not to be considered as being limited thereby. For example, it would also be possible to generate the reaction force increase amount ΔF from when the risk potential PF rises to a predetermined value.

Moreover although, in the above described first through fifth preferred embodiments of the present invention, it was arranged to change over between the vehicle distance control and the drive force control, or the vehicle distance control and the speed control, according to the accelerator pedal actuation amount S, as an alternative, it would also be possible to change over between these control mode according to, for example, the speed V1 of the subject vehicle.

In the fifth preferred embodiment, while a single reaction force control motor 9 is used to generate both the reaction force AFr corresponding to the risk potential PF and the reaction force AFw corresponding to the pedal actuation speed wa, the reaction force AFr and the reaction force AFw may be generated by separate actuators, as well.

Finally although, in the above described first through fifth preferred embodiments of the present invention, the traveling situation in the environment surrounding the subject vehicle, such as information relating to the preceding vehicle was detected using the laser radar 5, it would also be possible, as an alternative, to detect the traveling situation around the subject vehicle using some other type of radar, such as millimeter-wave radar or the like. Furthermore, it would also be possible to detect the traveling situation by taking an image forwards from the subject vehicle using a CCD camera or the like, and by performing image processing thereupon.

The above described embodiments are examples, and various modifications can be made without departing from the spirit and scope of the invention.

The disclosure of the following priority application is herein incorporated by reference:

Japanese Patent Application No. 2002-177028, filed Jun. 18, 2002.

What is claimed is:

1. A vehicle driving assist system, comprising:
   a traveling situation detection device that detects a vehicle condition and a traveling environment around a subject vehicle;
   a risk potential calculation device that calculates a risk potential around the subject vehicle based upon detection results of the traveling situation detection device;
   an accelerator pedal reaction force control device that controls an actuation reaction force which is generated for an accelerator pedal based upon the risk potential which has been calculated by the risk potential calculation device;
   an actuation amount detection device that detects an actuation amount of the accelerator pedal; and
   a vehicle distance control device that controls a vehicle distance between the subject vehicle and a preceding vehicle present in front of the subject vehicle based upon the accelerator pedal actuation amount which is detected by the actuation amount detection device.

2. A vehicle driving assist system according to claim 1, further comprising:
   a drive force control device that controls a drive force for the subject vehicle based upon the accelerator pedal actuation amount which is detected by the actuation amount detection device; and
   a changeover device that changes over between drive force control by the drive force control device and vehicle distance control by the vehicle distance control device, based upon detection results of the actuation amount detection device and the traveling situation detection device.

3. A vehicle driving assist system according to claim 2, wherein:

the traveling situation detection device detects a subject vehicle speed, the vehicle distance and a relative speed between the subject vehicle and the preceding vehicle; and the risk potential calculation device calculates the risk potential based upon the subject vehicle speed, the vehicle distance, and the relative speed which are detected by the traveling situation detection device.

4. A vehicle driving assist system according to claim 2, wherein:

the changeover device selects the vehicle distance control device to perform the vehicle distance control when the preceding vehicle is present in front of the subject vehicle in its own vehicle lane and moreover the accelerator pedal actuation amount is within a predetermined range, while the changeover device selects the drive force control device to perform the drive force control when no preceding vehicle is present or the accelerator pedal actuation amount is outside of the predetermined range, based upon the detection results of the actuation amount detection device and the traveling situation detection device.

5. A vehicle driving assist system according to claim 4, wherein:

the drive force control device calculates a first target drive force to be generated for the subject vehicle according to the accelerator pedal actuation amount, and controls the drive force for the subject vehicle so as to generate the first target drive force; and the vehicle distance control device calculates a target distance between the subject vehicle and the preceding vehicle based upon the accelerator pedal actuation amount, calculates a second target drive force to be generated for the subject vehicle based upon the target distance, and controls drive force/braking force for the subject vehicle so as to generate the second target drive force.

6. A vehicle driving assist system according to claim 5, wherein:

the vehicle distance control device sets the second target drive force while taking the first target drive force which is calculated by the drive force control device as an upper limit of the second target drive force.

7. A vehicle driving assist system according to claim 4, wherein:

the drive force control device calculates a first target speed to be generated for the subject vehicle based upon the accelerator pedal actuation amount, calculates a third target drive force for implementing the first target speed, and controls the drive force for the subject vehicle so as to generate the third target drive force; and the vehicle distance control device calculates a target distance between the subject vehicle and the preceding vehicle based upon the accelerator pedal actuation amount, calculates a second target speed to be generated for the subject vehicle based upon the target distance, calculates a fourth target drive force for implementing the second target speed, and controls the drive force for the subject vehicle so as to generate the fourth target drive force.

8. A vehicle driving assist system according to claim 7, wherein:

the vehicle distance control device sets the second target speed while taking the first target speed which is calculated by the drive force control device as an upper limit of the second target speed.

9. A vehicle driving assist system according to claim 2, wherein:

the risk potential calculation device predicts a future risk potential around the subject vehicle based upon the detection results of the traveling situation detection device and the actuation amount detection device when the vehicle distance control is selected by the changeover device.

10. A vehicle driving assist system according to claim 1, wherein:

the vehicle distance control device sets the target distance so that the target distance becomes smaller as the accelerator pedal actuation amount becomes greater.

11. A vehicle driving assist system according to claim 10, wherein:

the vehicle distance control device sets the target distance so that the target distance varies in a stepwise manner with respect to change in the accelerator pedal actuation amount.

12. A vehicle driving assist system according to claim 2, further comprising:

an actuation speed detection device that detects an actuation speed of the accelerator pedal; and wherein the accelerator pedal reaction force control device generates the actuation reaction force for the accelerator pedal by adding together a first accelerator pedal reaction force based upon the risk potential and a second accelerator pedal reaction force based upon the accelerator pedal actuation speed which is detected by the actuation speed detection device when the vehicle distance control is selected by the changeover device.

13. A vehicle driving assist system, comprising:

a traveling situation detection means for detecting a vehicle condition and a traveling environment around a subject vehicle;

a risk potential calculation means for calculating a risk potential around the subject vehicle based upon detection results of the traveling situation detection means;

an accelerator pedal reaction force control means for controlling an actuation reaction force which is generated for an accelerator pedal based upon the risk potential which has been calculated by the risk potential calculation means;

an actuation amount detection means for detecting an actuation amount of the accelerator pedal; and a vehicle distance control means for controlling a distance between the subject vehicle and a preceding vehicle present in front of the subject vehicle based upon the accelerator pedal actuation amount which is detected by the actuation amount detection means.

14. A vehicle driving assist method, comprising:

detecting a vehicle condition and a traveling environment around a subject vehicle;

calculating a risk potential around the subject vehicle based upon the vehicle condition and the traveling environment around the subject vehicle;

controlling an actuation reaction force for an accelerator pedal based upon the risk potential which has been calculated; and changing over control mode upon the subject vehicle based upon an actuation amount of the accelerator pedal between a vehicle distance control and a drive force control, with the vehicle distance control controlling a distance between the subject vehicle and a preceding vehicle present in front of the subject vehicle based upon the accelerator pedal actuation amount, and the drive force control controlling a drive force for the subject vehicle based upon the accelerator pedal actuation amount.

15. A vehicle, comprising:

a traveling situation detection device that detects a vehicle condition and a traveling environment around a subject vehicle;

a risk potential calculation device that calculates a risk potential around the subject vehicle based upon detection results of the traveling situation detection device;

an accelerator pedal reaction force control device that controls an actuation reaction force which is generated for an accelerator pedal based upon the risk potential which has been calculated by the risk potential calculation device;

an actuation amount detection device that detects an actuation amount of the accelerator pedal; and a vehicle distance control device that controls a distance between the subject vehicle and a preceding vehicle present in front of the subject vehicle based upon the accelerator pedal actuation amount which is detected by the actuation amount detection device.

* * * * *